United States Patent
Juliato et al.

(10) Patent No.: US 11,354,406 B2
(45) Date of Patent: Jun. 7, 2022

(54) PHYSICS-BASED APPROACH FOR ATTACK DETECTION AND LOCALIZATION IN CLOSED-LOOP CONTROLS FOR AUTONOMOUS VEHICLES

(71) Applicant: Intel Corporation, Santa Clara, CA (US)

(72) Inventors: Marcio Juliato, Portland, OR (US); Shabbir Ahmed, Beaverton, OR (US); Manoj Sastry, Portland, OR (US); Liuyang L. Yang, Portland, OR (US); Vuk Lesi, Durham, NC (US); Li Zhao, Beaverton, OR (US)

(73) Assignee: INTEL CORPORATION, Santa Clara, CA (US)

(*) Notice: Subject to any disclaimer, the term of this patent is extended or adjusted under 35 U.S.C. 154(b) by 255 days.

(21) Appl. No.: 16/021,409

(22) Filed: Jun. 28, 2018

(65) Prior Publication Data
US 2019/0042738 A1 Feb. 7, 2019

(51) Int. Cl.
| | |
|---|---|
| *G06F 21/55* | (2013.01) |
| *H04L 9/40* | (2022.01) |
| *H04W 4/48* | (2018.01) |
| *H04W 4/38* | (2018.01) |
| *H04W 12/122* | (2021.01) |

(52) U.S. Cl.
CPC .......... *G06F 21/552* (2013.01); *G06F 21/554* (2013.01); *H04L 63/1416* (2013.01); *H04L 63/1458* (2013.01); *H04L 63/1466* (2013.01); *H04L 63/1483* (2013.01); *H04W 4/38* (2018.02); *H04W 4/48* (2018.02); *H04W 12/122* (2021.01); *G06F 2221/034* (2013.01)

(58) Field of Classification Search
CPC .......... G06F 21/552; G06F 21/554; G06F 2221/034; H04L 63/1483; H04L 63/1416; H04L 63/1458; H04L 63/1466; H04W 4/48; H04W 4/38; H04W 12/1204
See application file for complete search history.

(56) References Cited

U.S. PATENT DOCUMENTS

| | | | | |
|---|---|---|---|---|
| 8,849,557 | B1 * | 9/2014 | Levandowski | G08G 1/0965 701/300 |
| 9,150,209 | B2 * | 10/2015 | Hermsen | B60T 17/221 |

(Continued)

FOREIGN PATENT DOCUMENTS

| | | | | |
|---|---|---|---|---|
| WO | WO-2018104929 A1 * | 6/2018 | | G05B 19/042 |
| WO | WO-2018146028 A1 * | 8/2018 | | |

OTHER PUBLICATIONS

Alexander M. Wyglinski et al., Security of Autonomous Systems Employing Embedded Computing and Sensors, IEEE, 2013.*

(Continued)

*Primary Examiner* — David Garcia Cervetti
(74) *Attorney, Agent, or Firm* — Spectrum IP Law Group LLC

(57) ABSTRACT

Methods and apparatus relating to a physics-based approach for attack detection and/or localization in closed-loop controls for autonomous vehicles are described. In an embodiment, multiple state estimators are used to compute a set of residuals to detect, classify, and/or localize attacks. This allows for determination of an attacker's location and the kind of attack being perpetrated. Other embodiments are also disclosed and claimed.

27 Claims, 12 Drawing Sheets

(56) References Cited

U.S. PATENT DOCUMENTS

| | | | | |
|---|---|---|---|---|
| 9,344,856 B2* | 5/2016 | Zhang | | G08G 1/163 |
| 9,428,013 B2* | 8/2016 | Singh | | B60C 11/246 |
| 9,507,346 B1* | 11/2016 | Levinson | | G06F 3/04847 |
| 9,606,539 B1* | 3/2017 | Kentley | | G05D 1/0027 |
| 9,612,123 B1* | 4/2017 | Levinson | | G01C 21/26 |
| 9,632,502 B1* | 4/2017 | Levinson | | H04L 41/0816 |
| 9,705,678 B1* | 7/2017 | Wang | | G06F 21/602 |
| 9,843,594 B1* | 12/2017 | Evans | | H04L 63/1425 |
| 10,120,003 B2* | 11/2018 | Haran | | G06F 11/00 |
| 10,124,768 B1* | 11/2018 | Bocca | | B60R 25/24 |
| 10,193,903 B1* | 1/2019 | Bajpai | | H04L 63/1425 |
| 10,268,191 B1* | 4/2019 | Lockwood | | G05D 1/0027 |
| 10,372,569 B2* | 8/2019 | Premerlani | | G06F 11/3672 |
| 10,505,955 B2* | 12/2019 | Mestha | | G06K 9/62 |
| 10,859,682 B2* | 12/2020 | Pacala | | G01S 7/497 |
| 2004/0158355 A1* | 8/2004 | Holmqvist | | G05D 1/0236 |
| | | | | 701/23 |
| 2008/0026671 A1* | 1/2008 | Smith | | A63H 17/36 |
| | | | | 446/456 |
| 2008/0061625 A1* | 3/2008 | Schmitt | | B60C 23/0408 |
| | | | | 303/146 |
| 2009/0082967 A1* | 3/2009 | Hara | | B60H 1/00771 |
| | | | | 701/530 |
| 2010/0063686 A1* | 3/2010 | Kohler | | B60R 21/0132 |
| | | | | 701/45 |
| 2011/0178611 A1* | 7/2011 | Daraiseh | | G05B 19/0428 |
| | | | | 700/79 |
| 2011/0307139 A1* | 12/2011 | Caminiti | | G08G 1/163 |
| | | | | 701/32.2 |
| 2012/0330542 A1* | 12/2012 | Hafner | | G08G 1/163 |
| | | | | 701/301 |
| 2013/0184928 A1* | 7/2013 | Kerkhof | | G07C 5/085 |
| | | | | 701/29.1 |
| 2013/0238192 A1* | 9/2013 | Breu | | G01S 13/726 |
| | | | | 701/41 |
| 2014/0067154 A1* | 3/2014 | Yu | | G06F 17/00 |
| | | | | 701/1 |
| 2014/0152422 A1* | 6/2014 | Breed | | B60R 25/25 |
| | | | | 340/5.52 |
| 2014/0157405 A1* | 6/2014 | Joll | | H04L 63/1425 |
| | | | | 726/22 |
| 2014/0297119 A1* | 10/2014 | Giovanardi | | F16K 11/065 |
| | | | | 701/38 |
| 2014/0301276 A1* | 10/2014 | Carlsson | | H04L 43/00 |
| | | | | 370/328 |
| 2014/0358362 A1* | 12/2014 | Breed | | G06F 8/65 |
| | | | | 701/31.9 |
| 2014/0358840 A1* | 12/2014 | Tadic | | G01P 15/14 |
| | | | | 706/52 |
| 2015/0020152 A1* | 1/2015 | Litichever | | H04L 63/14 |
| | | | | 726/1 |
| 2015/0046133 A1* | 2/2015 | Morita | | G06F 30/20 |
| | | | | 703/2 |
| 2015/0089236 A1* | 3/2015 | Han | | H04L 9/3271 |
| | | | | 713/168 |
| 2015/0154868 A1* | 6/2015 | Neuner | | G01C 21/3685 |
| | | | | 455/414.1 |
| 2015/0270968 A1* | 9/2015 | Nairn | | H04L 9/3242 |
| | | | | 713/181 |
| 2015/0271201 A1* | 9/2015 | Ruvio | | H04L 63/1408 |
| | | | | 726/23 |
| 2016/0082960 A1* | 3/2016 | Slaton | | B60W 50/085 |
| | | | | 701/93 |
| 2016/0197944 A1* | 7/2016 | Allouche | | H04L 63/1416 |
| | | | | 726/23 |
| 2016/0205117 A1* | 7/2016 | Laifenfeld | | H04L 63/1416 |
| | | | | 726/23 |
| 2016/0209838 A1* | 7/2016 | Uchida | | G07C 5/085 |
| 2016/0225201 A1* | 8/2016 | Hiroki | | G07C 5/08 |
| 2016/0330629 A1* | 11/2016 | Laifenfeld | | H04W 12/12 |
| 2016/0344704 A1* | 11/2016 | Stumpf | | H04L 67/12 |
| 2016/0381068 A1* | 12/2016 | Galula | | H04W 12/10 |
| | | | | 726/23 |
| 2017/0006135 A1* | 1/2017 | Siebel | | H04L 67/12 |
| 2017/0013005 A1* | 1/2017 | Galula | | H04L 67/12 |
| 2017/0057540 A1* | 3/2017 | Anma | | B62D 5/0463 |
| 2017/0090478 A1* | 3/2017 | Blayvas | | G07C 5/0808 |
| 2017/0123421 A1* | 5/2017 | Kentley | | G06Q 10/00 |
| 2017/0123422 A1* | 5/2017 | Kentley | | B60L 15/20 |
| 2017/0123428 A1* | 5/2017 | Levinson | | G05D 1/0257 |
| 2017/0123429 A1* | 5/2017 | Levinson | | G01C 21/34 |
| 2017/0124476 A1* | 5/2017 | Levinson | | G06V 20/58 |
| 2017/0124781 A1* | 5/2017 | Douillard | | G01S 17/931 |
| 2017/0126810 A1* | 5/2017 | Kentley | | G06F 3/04842 |
| 2017/0132334 A1* | 5/2017 | Levinson | | G01S 17/931 |
| 2017/0132934 A1* | 5/2017 | Kentley | | G08G 1/202 |
| 2017/0146991 A1* | 5/2017 | Parekh | | B64D 45/00 |
| 2017/0149820 A1* | 5/2017 | Ruvio | | H04L 63/1441 |
| 2017/0192431 A1* | 7/2017 | Foster | | A01B 79/005 |
| 2017/0261947 A1* | 9/2017 | Koga | | B60W 40/09 |
| 2017/0278323 A1* | 9/2017 | Gupta | | G06F 21/50 |
| 2017/0286675 A1* | 10/2017 | Shin | | H04W 12/61 |
| 2017/0359366 A1* | 12/2017 | Bushey | | H04L 63/1433 |
| 2017/0365171 A1* | 12/2017 | Haran | | H04W 12/121 |
| 2018/0025156 A1* | 1/2018 | Dagan | | H04L 63/1483 |
| | | | | 713/161 |
| 2018/0060267 A1* | 3/2018 | Sutton | | H04L 63/0245 |
| 2018/0069874 A1* | 3/2018 | Saeki | | H04L 12/40 |
| 2018/0091550 A1* | 3/2018 | Cho | | B60R 16/0232 |
| 2018/0109622 A1* | 4/2018 | Galula | | B60R 16/023 |
| 2018/0131522 A1* | 5/2018 | Lawlis | | H04L 9/0631 |
| 2018/0136651 A1* | 5/2018 | Levinson | | G05D 1/0027 |
| 2018/0154899 A1* | 6/2018 | Tiwari | | G05D 1/0217 |
| 2018/0164825 A1* | 6/2018 | Matus | | G05D 1/0214 |
| 2018/0167360 A1* | 6/2018 | Maeda | | H04L 12/40006 |
| 2018/0170348 A1* | 6/2018 | Kim | | B60W 10/18 |
| 2018/0189483 A1* | 7/2018 | Litichever | | H04L 67/2823 |
| 2018/0191738 A1* | 7/2018 | David | | G06F 21/55 |
| 2018/0196941 A1* | 7/2018 | Ruvio | | H04L 63/0227 |
| 2018/0196942 A1* | 7/2018 | Kashyap | | G06F 21/561 |
| 2018/0205703 A1* | 7/2018 | Grau | | G06F 21/554 |
| 2018/0255082 A1* | 9/2018 | Ostergaard | | H04W 12/122 |
| 2018/0257664 A1* | 9/2018 | Remboski | | G07C 5/0808 |
| 2018/0262466 A1* | 9/2018 | Atad | | H04L 43/00 |
| 2018/0295147 A1* | 10/2018 | Haga | | H04L 63/1441 |
| 2018/0297586 A1* | 10/2018 | Kim | | A61B 5/163 |
| 2018/0302422 A1* | 10/2018 | Kishikawa | | H04L 63/1416 |
| 2018/0305876 A1* | 10/2018 | Langford | | G08G 1/0145 |
| 2018/0314921 A1* | 11/2018 | Mercep | | G06K 9/6289 |
| 2018/0316584 A1* | 11/2018 | Ujiie | | H04L 41/145 |
| 2018/0316721 A1* | 11/2018 | Nakano | | H04L 12/40 |
| 2018/0337938 A1* | 11/2018 | Kneib | | H04W 4/48 |
| 2018/0351915 A1* | 12/2018 | Nakano | | H04L 63/0227 |
| 2018/0365888 A1* | 12/2018 | Satzoda | | G06N 3/0454 |
| 2018/0375879 A1* | 12/2018 | Carlesimo | | H04W 12/12 |
| 2019/0028500 A1* | 1/2019 | Lee | | H04L 12/40032 |
| 2019/0036946 A1* | 1/2019 | Ruvio | | H04W 12/106 |
| 2019/0042748 A1* | 2/2019 | Shabtai | | G08G 5/003 |
| 2019/0044912 A1* | 2/2019 | Yang | | G06F 21/50 |
| 2019/0104149 A1* | 4/2019 | Zeng | | H04L 63/1441 |
| 2019/0138827 A1* | 5/2019 | Uejima | | G06T 7/73 |
| 2019/0141070 A1* | 5/2019 | Tsurumi | | H04L 63/1425 |
| 2019/0149561 A1* | 5/2019 | Maeda | | H04L 12/40 |
| | | | | 726/23 |
| 2019/0149562 A1* | 5/2019 | Maeda | | H04L 63/1416 |
| | | | | 726/23 |
| 2019/0179320 A1* | 6/2019 | Pacala | | G05D 1/0214 |
| 2019/0180744 A1* | 6/2019 | Lee | | G10L 25/51 |
| 2019/0187706 A1* | 6/2019 | Zhou | | G05D 1/0088 |
| 2019/0191020 A1* | 6/2019 | Hamada | | B60R 16/023 |
| 2019/0228767 A1* | 7/2019 | Kim | | G10L 15/22 |
| 2019/0230106 A1* | 7/2019 | Abbaszadeh | | H04L 63/1441 |
| 2019/0245872 A1* | 8/2019 | Shin | | H04L 63/1416 |
| 2019/0266295 A1* | 8/2019 | Masuda | | G07C 5/008 |
| 2019/0279507 A1* | 9/2019 | Ishisaka | | G08G 1/16 |
| 2019/0287079 A1* | 9/2019 | Shiraishi | | G07C 5/0841 |
| 2019/0308589 A1* | 10/2019 | Maluf | | B60R 25/34 |
| 2019/0315351 A1* | 10/2019 | Smith | | G06N 3/084 |
| 2019/0342115 A1* | 11/2019 | Lieder | | H04L 63/162 |
| 2019/0384870 A1* | 12/2019 | Shiraishi | | G06F 30/20 |

(56) References Cited

U.S. PATENT DOCUMENTS

| | | | |
|---|---|---|---|
| 2019/0385386 A1* | 12/2019 | Davidson | G07C 5/0858 |
| 2019/0385387 A1* | 12/2019 | Davidson | G07C 5/008 |
| 2020/0053112 A1* | 2/2020 | Torisaki | H04L 12/40006 |
| 2020/0213351 A1* | 7/2020 | Shin | H04L 63/1408 |
| 2020/0234582 A1* | 7/2020 | Mintz | G08G 1/0145 |
| 2020/0290647 A1* | 9/2020 | Anderson | G01C 21/3691 |
| 2020/0320807 A1* | 10/2020 | Gorti | B60W 60/001 |
| 2020/0334554 A1* | 10/2020 | Takahashi | G06F 11/3013 |
| 2021/0005088 A1* | 1/2021 | Rander | G08G 1/0129 |

OTHER PUBLICATIONS

Poudel et al., Design and Comparative Evaluation of GPGPU- and FPGA-based MPSoC ECU Architectures for Secure, Dependable, and Real-Time Automotive CPS, IEEE, 2017.*

Loukas et al., Cloud-Based Cyber-Physical Intrusion Detection for Vehicles Using Deep Learning, IEEE, 2017.*

Lee et al., Attack-Aware Multi-Sensor Integration Algorithm for Autonomous Vehicle Navigation Systems, Sep. 2017, IEEE.*

P. Guo, H. Kim, N. Virani, J. Xu, M. Zhu and P. Liu, "RoboADS: Anomaly Detection Against Sensor and Actuator Misbehaviors in Mobile Robots," 2018 48th Annual IEEE/IFIP International Conference on Dependable Systems and Networks (DSN), 2018, pp. 574-585, doi: 10.1109/DSN.2018.00065.*

F. Fei et al., "Cross-Layer Retrofitting of UAVs Against Cyber-Physical Attacks," 2018 IEEE International Conference on Robotics and Automation (ICRA), 2018, pp. 550-557, doi: 10.1109/ICRA.2018.8462886.*

G. Loukas, T. Vuong, R. Heartfield, G. Sakellari, Y. Yoon and D. Gan, "Cloud-Based Cyber-Physical Intrusion Detection for Vehicles Using Deep Learning," in IEEE Access, vol. 6, pp. 3491-3508, 2018, doi: 10.1109/ACCESS.2017.2782159.*

S. Lee, Y. Cho and B. Min, "Attack-aware multi-sensor integration algorithm for autonomous vehicle navigation systems," 2017 IEEE International Conference on Systems, Man, and Cybernetics (SMC), 2017, pp. 3739-3744, doi: 10.1109/SMC.2017.8123215.*

"Kalman Filter," Wikipedia entry, downloaded on Jun. 17, 2018, 31 pages, retreived from https://en.wikipedia.org/wiki/Kalman_filter.

Welch, et al., "An Introduction to the Kalman Filter," catalog, 2001, 81 pages, Course 8, SIGGRAPH, Los Angeles, CA.

* cited by examiner

| Impacted Parameters | | | | Figure | Attack |
| --- | --- | --- | --- | --- | --- |
| Speed Residual Power $r_{speed}$ | Controller Residual Power $r_{ctrl}$ | DC Current | DC Current Residual Power $r_{current}$ | | |
| ■ | | | | 4 | Internal sensor or internal actuator attack w/o load |
| ■ | ■ | ■ | | 4 | Internal sensor or internal actuator attack w/ load |
| | | ■ | ■ | 5A | External sensor attack w/o load |
| | ■ | ■ | ■ | 5A | External sensor attack w/ load |
| ■ | ■ | ■ | ■ | 5B | External controller attack w/o load |
| ■ | ■ | | | 5B | External controller attack w/ load |
| | | ■ | | 5C | Internal controller attack w/o load |
| ■ | ■ | ■ | | 5C | Internal controller attack w/ load |

PHYSICS-BASED APPROACH FOR ATTACK DETECTION AND LOCALIZATION IN CLOSED-LOOP CONTROLS FOR AUTONOMOUS VEHICLES

FIELD

The present disclosure generally relates to the field of electronics. More particularly, an embodiment relates to a physics-based approach for attack detection and/or localization in closed-loop controls for autonomous vehicles.

BACKGROUND

Autonomous driving promises a world where a vehicle can transport its passengers from point A to point B with ultimate safety and with minimal human intervention.

However, in-vehicle control systems have been exposed to the outside world to enhance connectivity. As a result, there may be innumerable paths that an attacker could explore to reach safety-critical closed-loop control systems (such as adaptive cruise control, lane keep assist, etc.). For example, attackers may be able to not only initiate DoS (Denial-of-Service) attacks (e.g., by jamming control-related messages), but also to divert the system over a trajectory different than target (e.g., by spoofing steering control information).

As automotive systems evolve from driver-assisted to fully Automated Driving Systems (ADS), previously open-loop systems controlled by the driver will become closed under governance of additional distributed controllers (e.g., longitudinal and lateral control, emergency braking, etc.). Hence, securing closed-loop control systems has become critical for ensuring safety and security of autonomous vehicles.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 6 shows a table with information regarding attack characterization based on impacted parameters, according to an embodiment.

DETAILED DESCRIPTION

Figure 1:
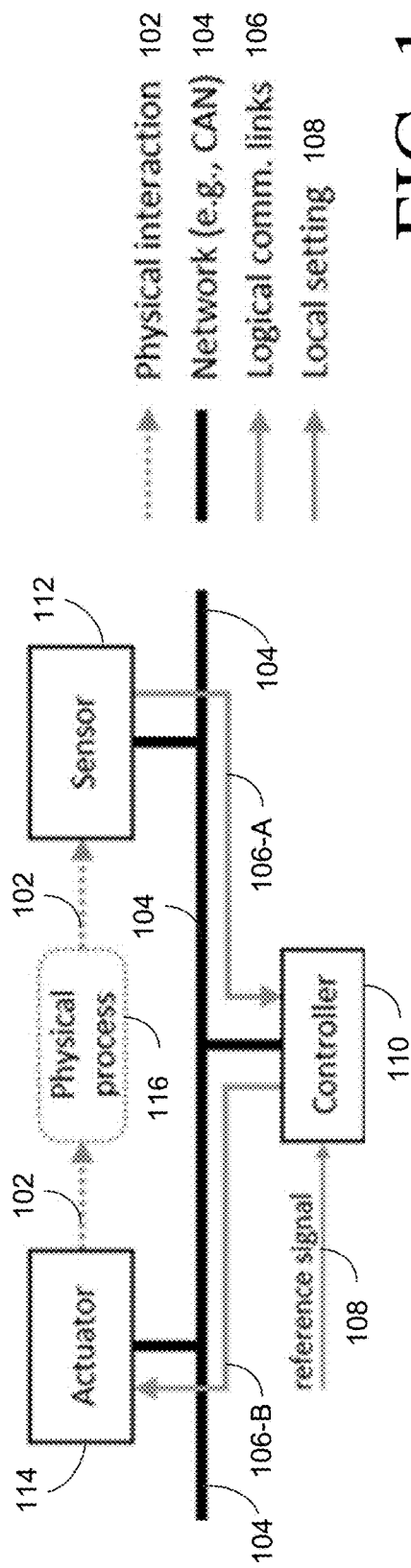
FIG. 1 illustrates a block diagram of a closed-loop architecture, according to an embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, securing closed-loop control systems has become critical for ensuring safety and security of autonomous vehicle solutions. Multiple types of intrusion detectors may be utilized. For example, bus patterning intrusion detection systems (e.g., frequency based) can detect a particular type of attack where additional messages are injected into the network, disturbing the bus schedule (e.g., periodicity, intra and inter message correlation). Further, ECU (Electronic Control Unit) identification schemes (e.g., fingerprinting based on physical attributes) targets localization of the attacker to prevent some impersonation attacks. Additionally, cryptographic methods can provide data authentication through signatures and MACs (Message Authentication Codes) therefore avoiding some impersonation attacks.

The aforementioned techniques may rely on Machine Learning (ML) schemes which are usually computationally heavy and may impact detection/reaction time. Additionally, the ML schemes use a training phase during which no attacks are assumed to be occurring and their detection scope is limited to the features observed during the training/retraining phase. Cryptographic methods such as signatures and MACs are infeasible for ADS, in part, due to real-time and bandwidth constraints in legacy networks. Moreover, they do not offer full protection in case of compromised ECUs, since an attacker with software execution can send out malicious messages which would be considered as authentic by other ECUs. In addition, some intrusion detector systems offer a limited detection scope as they do not take into account network and/or controller based attacks.

To this end, some embodiments relate to a physics-based approach for attack detection and/or localization in closed-loop controls for autonomous vehicles or ADS. In an embodiment, multiple state estimators are used to compute a set of residuals to detect, classify, and/or localize attacks. This allows for determination of an attacker's location and the kind of attack being perpetrated, which can be a crucial step towards the protection of autonomous vehicles. As discussed herein, the difference between the actual/current state of interest and the model-based prediction (where the model-based prediction corresponds to a model of the current state of interest) is referred to as "residual" signal.

Moreover, in at least one embodiment, the physics-based approach proposed herein utilizes state prediction based on physical models of system's dynamics. For instance, a vehicle speed predictor could take current speed and acceleration as inputs to predict vehicle speed in the next time instant based on physical properties of the vehicle. In an embodiment, a combination of multiple residual signals (e.g., two or more residual signals) forms a pattern that directly correlates to the overall system behavior, which in turn allows for attack characterization.

Further, unlike conventional information-based security measures, various embodiments propose new approaches that utilize physical properties of the system, along with the controller state estimation, to enable computationally-inexpensive analytical redundancy. For example, a mathematical model-based replica of the system is simultaneously executed to detect attacks. Consequently, such embodiments provide continuous fine-grained monitoring of closed-loop controls with real-time attack detection and/or localization to enable quicker responses.

Another embodiment is able to monitor the network (coupled to components of an ADS) and performs finer-grain attack characterization (e.g., determine type and/or location) by estimating the system's and controller's states. The proposed methodology leverages the knowledge of system dynamics to minimize false positives and computational load; consequently, allowing for a more quick/prompt response to attacks.

In one embodiment, logic used to generate/calculate the residual signals/pulses/data is mounted or otherwise physically coupled to a vehicle. As discussed herein, a "vehicle" generally refers to any transportation device capable of being operated manually (or non-autonomously), semi-autonomously, fully autonomously, etc., such as an automobile, a truck, a motorcycle, an airplane, a helicopter, a vessel/ship, a train, a drone, etc. whether or not the vehicle is a passenger or commercial vehicle, and regardless of the power source type (such as one or more of: fossil fuel(s), solar energy, electric energy, chemical energy, nuclear energy, etc.) and regardless of the physical state of the power source (e.g., solid, liquid, gaseous, etc.) used to move the vehicle.

FIG. 1 illustrates a block diagram of a closed-loop architecture, according to an embodiment. Generally, closed-loop (or feedback) control systems refer to all systems that feed measurements or estimates of the controlled variable(s) back to the system's controller in order to achieve set-point tracking.

Referring to FIG. 1, the vehicle's cruise controller logic 110 accepts a set-point target speed (reference signal 108), originating from any source like driver, subsystem, planner of autonomous vehicle, etc., and measures the current speed of the vehicle (feedback signal 106-A from speed sensor 112), with the goal of controlling the engine power to optimally maintain the target speed. The controller 110 subtracts the feedback measurement 106-A from the reference signal 108 to determine how far the current output of the system is from the target one. This difference is fed into a control algorithm, whose output (actuation command/signal 106-B) is sent to one or more actuator(s) 114. This affects the state of the physical process 116, which is in turn reflected at the sensor(s) 112. In a vehicle, for example, the cruise controller changes throttle angle and other engine actuation commands in order to maintain a target speed. This process is continuously repeated therefore allowing fine-grained, real-time control.

An embodiment provides state estimation for anomaly detection. A closed-loop control design incorporates knowledge of the behavior of the controlled system, which is captured through physical and mathematical models. The possession of these models can be leveraged for purposes of devising attack detection techniques that include localization of compromised ECUs (or other ADS components) and specific signals. By executing a state estimator (e.g., Kalman filter), it is possible to accurately estimate the output of a given system based on its model, and the current measurements from sensors. For example, residual signals may be calculated by subtracting the predicted output from the output currently reported by the sensor(s). While some embodiments are discussed with reference to a Kalman filter, embodiments are not limited to application of a Kalman filter and other techniques for estimation of unknown variables that tend to provide a more accurate estimation (e.g., by utilizing a probability distribution of multiple variables for a given timeframe) may be used.

Under normal operation, residual signals remain around zero (e.g., with small deviations due to noise). If an attack condition is present, statistical properties (e.g., mean value and deviation) of the corresponding residual signals change, indicating the presence of attack and given a certain pattern of residuals, potentially isolating the attacker's location. Actuation command prediction can be similarly obtained for controller outputs towards localization of controller-based attacks.

At least one embodiment utilizes residual thresholding. Power of residual signals for linearly-modeled systems with Gaussian noise is shown to be $\chi 2$ distributed with zero mean under no-attack, no-disturbance conditions. This allows for calculation of the probability of a false positive for a given level of threshold (e.g., by calculating the cumulative distribution function).

In the case when disturbances are present, the behavior of the system will deviate from the modeled. For instance, when a vehicle encounters an uphill climb under cruise control, the cruise controller increases throttle opening in order to compensate for the additional load to maintain the same target speed. This causes a similar effect on residual signals of speed sensors as an attack that biases sensor measurements. This effectively invalidates the use of a fixed threshold for testing increased residual power in realistic systems.

Today's vehicles are equipped with a plethora of sensors that can provide environmental and working condition contexts. Two possible solutions to this problem are discussed herein for illustration purposes. Adaptive estimation can adjust the parameters of the model used for prediction as operating conditions change, so that it matches the behavior that the system is currently exhibiting under load. This method may use disturbance models that capture how environmental perturbations (such as load) affect the system's dynamics. These models are made available to the corresponding state estimator. Alternatively, threshold adaption techniques can be applied. The threshold for residual power for one sensor can be made dependent on other sensors (e.g., the threshold can be adjusted for the speed sensor based on road inclination since it is expected that the cruise controller would operate the engine at higher throttle openings on roads with steeper inclinations).

One embodiment provides for attack detection scope. For example, control-loop relevant attacks can be classified as internal or external. Internal attacks consider that the attacker has software execution access on an ECU (that is interfacing a sensor, actuator, or executing the control algorithm), and is able to modify sensor measurements and actuation commands before they are executed/consumed by the ECU itself or sent to the network. By contrast, external attacks access the network to transmit additional messages on the bus that contain false sensor measurements or actuation commands, while not being able to interfere with the contents of the originally scheduled messages. Correspondingly, these types of attacks can be performed on all ECUs participating in closed-loop control.

Specifically, assume that the plant (where the plant is the physical process being controlled in an embodiment) can be modeled as discrete-time linear time-invariant (LTI) system with state and measurement equations as follows:

$$x_k = Ax_{k-1} + Bu_{k-1} + w_{k-1}, y_k = Cx_k + v_k \quad \text{(Eq. 1)}$$

where $x_k$ is the system state vector, A is the state transition matrix, $u_k$ is the vector of physical process inputs, B is the input matrix mapping available actuators to process inputs, $y_k$ is the vector of measurements, and C is the measurement matrix. $w_k$ and $v_k$ are the model and measurement noises, respectively, which can be assumed to be independently normally distributed. This type of model can also be used in control-theoretic research for analysis of dynamical systems.

For example, in a simplified cruise control model, the state of the system x is speed, while the input u is the force that the engine is delivering to the vehicle body. Vehicle speed can be measured, so the output y is also speed (captured by the measurement matrix C). Resistance forces and vehicle acceleration are modeled in parameters A and B. In turn, state estimation is performed in two steps. The prediction step of state estimation can be performed based on the previous state and the previous control input as:

$$\hat{x}_k^{predicted} = A\hat{x}_{k-1} + Bu_{k-1} \quad \text{(Eq. 2)}$$

Then, the state estimate is updated with the obtained measurement $y_k$ by weighting it with the Kalman gain matrix $K_k$:

$$\hat{x}_k^{updated} = \hat{x}_k^{predicted} + K_k(y_k - C\hat{x}_k^{predicted}) \quad \text{(Eq. 3)}$$

The Kalman gain is calculated optimally in the sense that the mean square error of the estimation is minimized. The member in prentices in Eq. 3 is the residual vector $r_k$ consisting of as many residual signals as there are sensors in the system. The detection criterion can be formulated as a hypothesis testing problem:

$$r_k^T \sum\nolimits^{-1} r_k \lesseqgtr g \quad \text{(Eq. 4)}$$

where g is a vector of thresholds and $\Sigma$ is the state estimation error covariance matrix (obtained during Kalman gain calculation). Controller state estimation is performed analogously.

Figure 2:
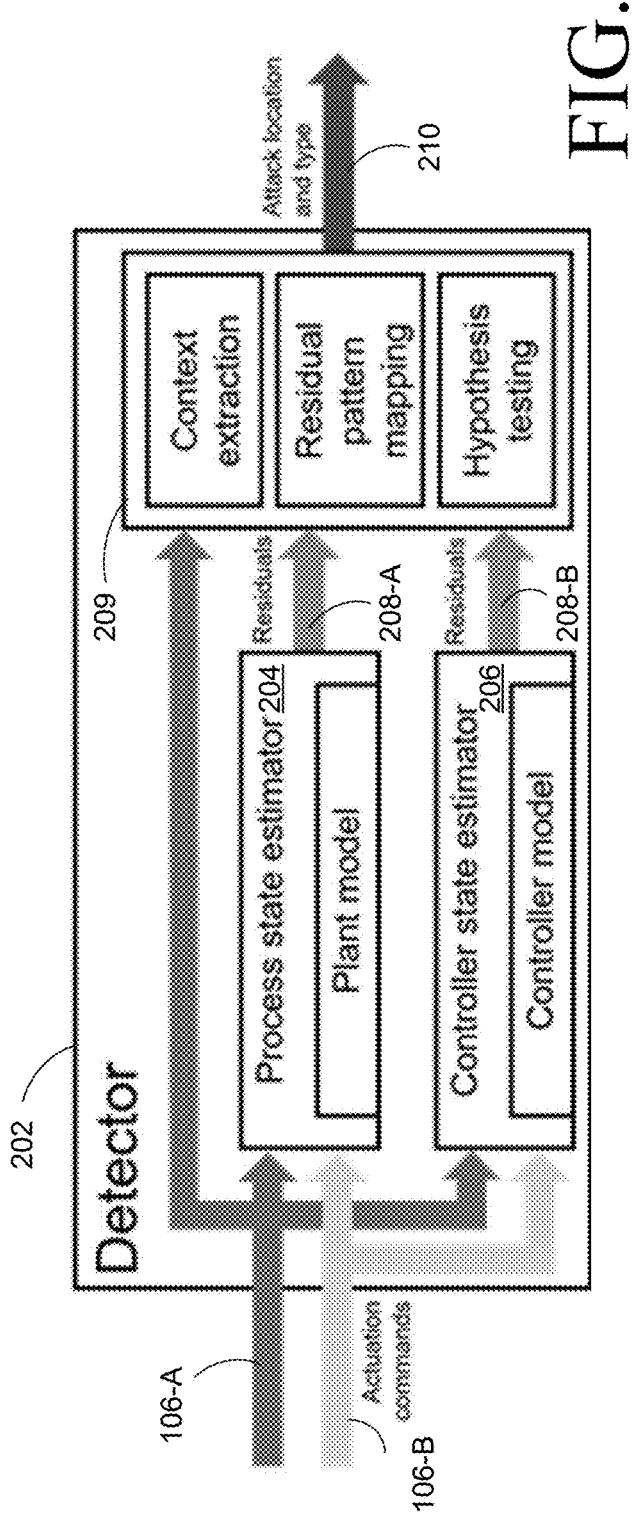
FIG. 2 illustrates a block diagram of a network-attached detector logic, according to an embodiment.

The methodology presented above enables attack detection and localization of the compromised ECU (in case of internal attacks), or the compromised signal (in case of external attacks), as shown in an experimental study with reference to FIG. 2. More Particularly, FIG. 2 illustrates a block diagram of a proposed network-attached detector logic, according to an embodiment.

Referring to FIGS. 1-2, an overall detector structure for a detector logic 202 includes process state estimator logic 204 (e.g., with a plant model such as discussed herein) and controller state estimator logic 206 (e.g., with a controller model such as discussed herein) to provide residual signals 208-A and 208-B based on sensor signal(s) 106-A and actuation commands 106-B. Residuals 208-A and 208-B are then provided to context extraction logic, residual pattern mapping logic, and hypothesis testing logic (e.g., the combination of which is labeled 209) to generate a signal 210 indicative of attack location and type.

Figure 3:
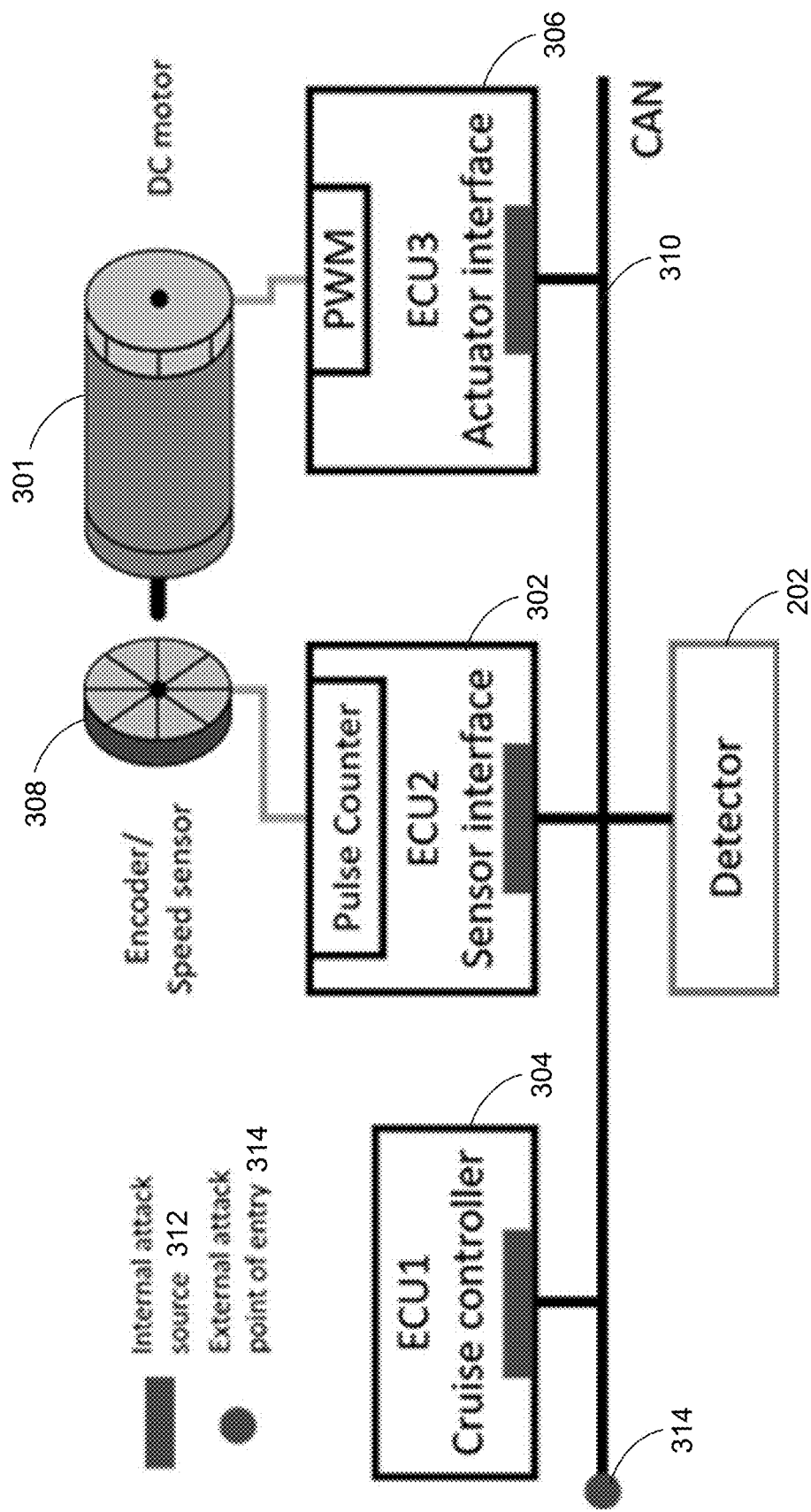
FIG. 3 illustrates a block diagram of a closed-loop speed control system, according to an embodiment.

An embodiment provides an experimental setup. For example, an experimental setup can be implemented to demonstrate closed-loop speed control for a DC (Direct Current) motor 301, as illustrated in FIG. 3. This setup is representative of a vehicle cruise control system since both control applications can be modeled with similar dynamics (Eq. 1). The setup consists of three ECUs: a sensor interface ECU 302, a cruise controller logic 304, and an actuator interface ECU 306 coupled via CAN bus. As discussed herein, a "bus" generally refers to a bus or interconnect to allow for communication of signals and/or data between various components of a system in a vehicle. The bus may be a shared bus or a point-to-point interconnect (or combinations thereof) in various embodiments. A "CAN" bus or "CANBUS" generally refers to a Controller Area Network used in vehicles to allow for microcontrollers and devices to communicate with each other (e.g., without a host computer). CAN is one example of a bus that can be used in various embodiments. Also, embodiments are not limited to usage of a bus and other forms of communication may be used like wireless communication, serial communication, etc.

Referring back to FIG. 3, an optical encoder 308 is used for sensing speed. Speed measurements are sent from the ECU interfacing the encoder 302 to the controller 304. In this setup, the DC motor 301 mimics the vehicle's engine and the optical encoder 308 mimics wheel speed sensors.

Moreover, in this example, the states of the controlled process are speed and DC current (elements of vector x in Eq. 1), and since both states can be measured, output vector y is also comprised of speed and DC current. Input u corresponds to pulse width. Constant matrices A, B, and C model specific motor's dynamics, which can be obtained from component's specifications or system identification. The controller can be described analogously. The controller compares the current speed measurement to the target speed and correspondingly calculates the actuation command/signal that it sends to the ECU 306 interfacing the actuator (motor). The actuator ECU 306 forwards this command to the DC motor 301 through the local actuation stage (e.g., Pulse Width Modulation (PWM) and amplification circuitry). In one embodiment, speed control is achieved by continuously executing this chain every 50 ms.

Even when the motor shaft is loaded, the speed is quickly returned to the target speed through the actions of the controller. State estimation can be implemented for the controlled system (DC motor) and the controller based on models obtained through system identification and design-time knowledge, on a centralized Detector (e.g., logic 202) that has access to the same CAN bus 310. The Detector constantly monitors the bus, updates residual signals and thus compares the currently exhibited behavior with model-based predications. The detector logic is able to detect and isolate attacks, occurrence of which it can report to an external entity. For attack localization, three residual signals may be generated that indicate how well currently observed speed, current and controller commands correspond to predicted values. However, embodiments are not limited to usage of three residuals, and two or more residuals may be used in an embodiment. Additionally, the magnitude of the current may be taken into account to characterize scenarios when the DC motor operates under load (e.g., to emulate real-world working conditions).

Furthermore, as discussed herein (and illustrated in FIG. 3 with the thick line 312 (in each ECU) and dot 314), two main attack methods may be considered, depending on how the attacker affects the system:

1) Internal Attack (also called Message Modification attack) considers that the attacker has gained software execution in an ECU and modifies its messages before they are sent to the bus; and 2) External Attack (also called Masquerade attack) considers that another ECU is sending messages on behalf of the authentic one. The attacks may come from a compromised ECU or by having physical access to the bus (e.g., through the OBDII (On-Board Diagnostics II port).

In the case of a controller ECU, an internal attacker may send out malicious commands, whereas the external attacker would inject commands/signals into the bus to masquerade as an authentic controller. In the sensor node, the internal attacker may bias the sensor readings prior to sending them to the bus, whereas the external attacker may inject additional sensor readings into the bus. Hence, the way that an attacker impacts the system will cause distinct residual signatures, therefore revealing the kind and location of the attack.

FIGS. 4, 5A, 5B, and 5C illustrate sample experimental results, according to some embodiments. These figures show sample residual signals recorded during experimental runs. These signals can be generated in real-time and used in the attack localization process for the attack scenarios mentioned above with respect to attack detection scope.

Figure 4:
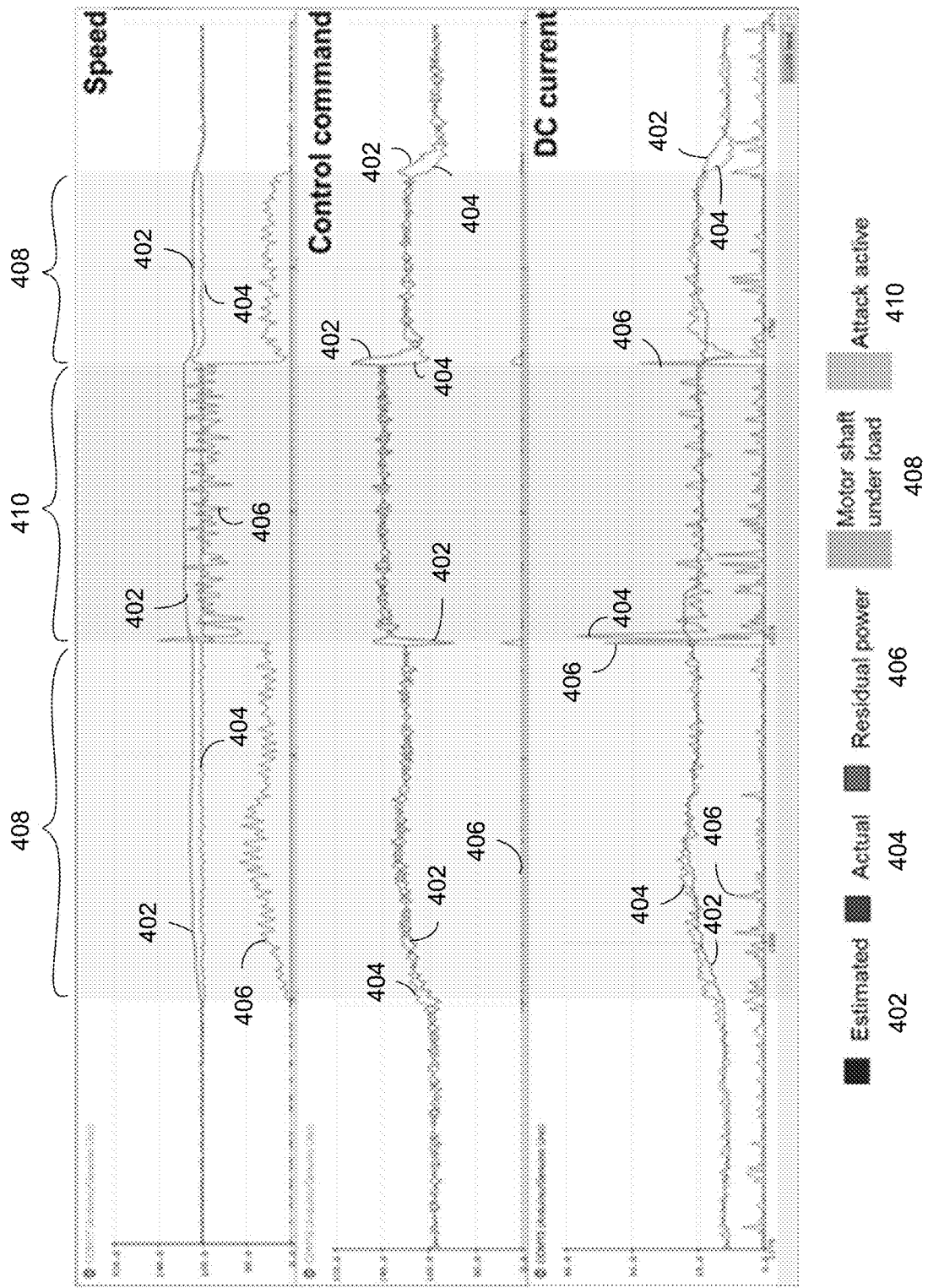
FIGS. 4, 5A, 5B, and 5C illustrate sample experimental results, according to some embodiments.

More specifically, FIG. 4 shows sample results for an internal bias attack against sensor or actuator ECU. The area 408 in FIG. 4 indicates when motor shaft has been presented with some load. It can be observed that the actual speed of revolution (signal 404 for "Speed") does not significantly change, which indicates feedback control is compensating for the load and maintaining the speed at the target level. This can also be observed by DC current and predicted controller outputs (increase visible in "Control command"). However, from the model's perspective, with higher control input, the speed of the motor should be higher. This phenomena is captured by a difference between the actual and the predicted speed (signals 404 vs. 402 in "Speed"), which is reflected on the increase in residual power (signal 406 in "Speed"). Further, the heavier the shaft load, the higher the residual power. Another indicator of the change in operating conditions is the increase in DC current of the motor (actual and predicted current draw in "DC current").

Once a negative sensor bias attack is launched (highlighted by region 410), the controller increases the control command to compensate for the introduced error. This produces a further increase in the speed residual power (signal 406 in "Speed"), since according to the model, the motor shaft should rotate faster with the given input. However, since shaft load did not change; there is no significant increase in DC current, therefore resulting in a pattern that clearly indicates that the system is under attack.

Figure 5A:
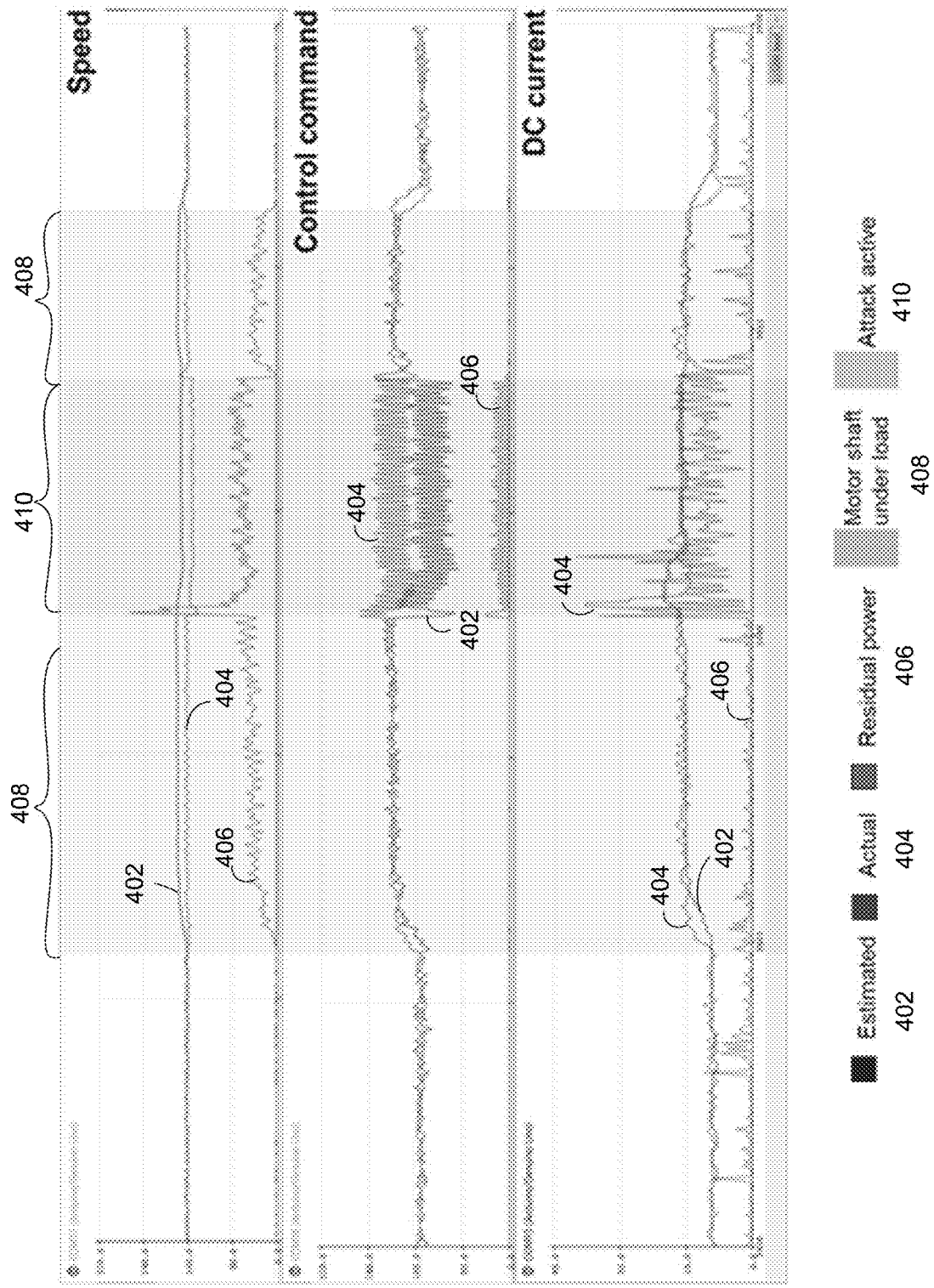
Figure 5B:
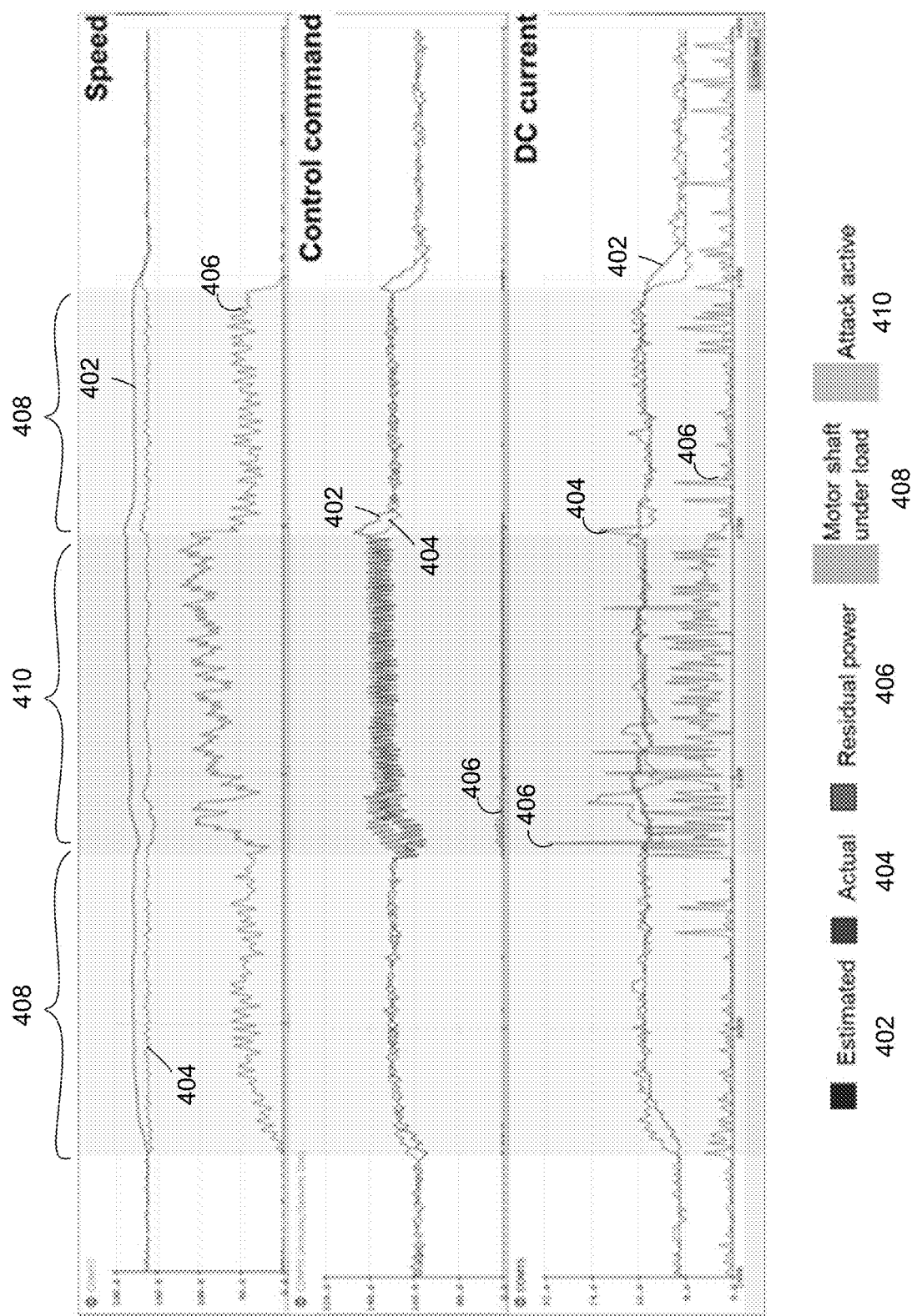
Figure 5C:
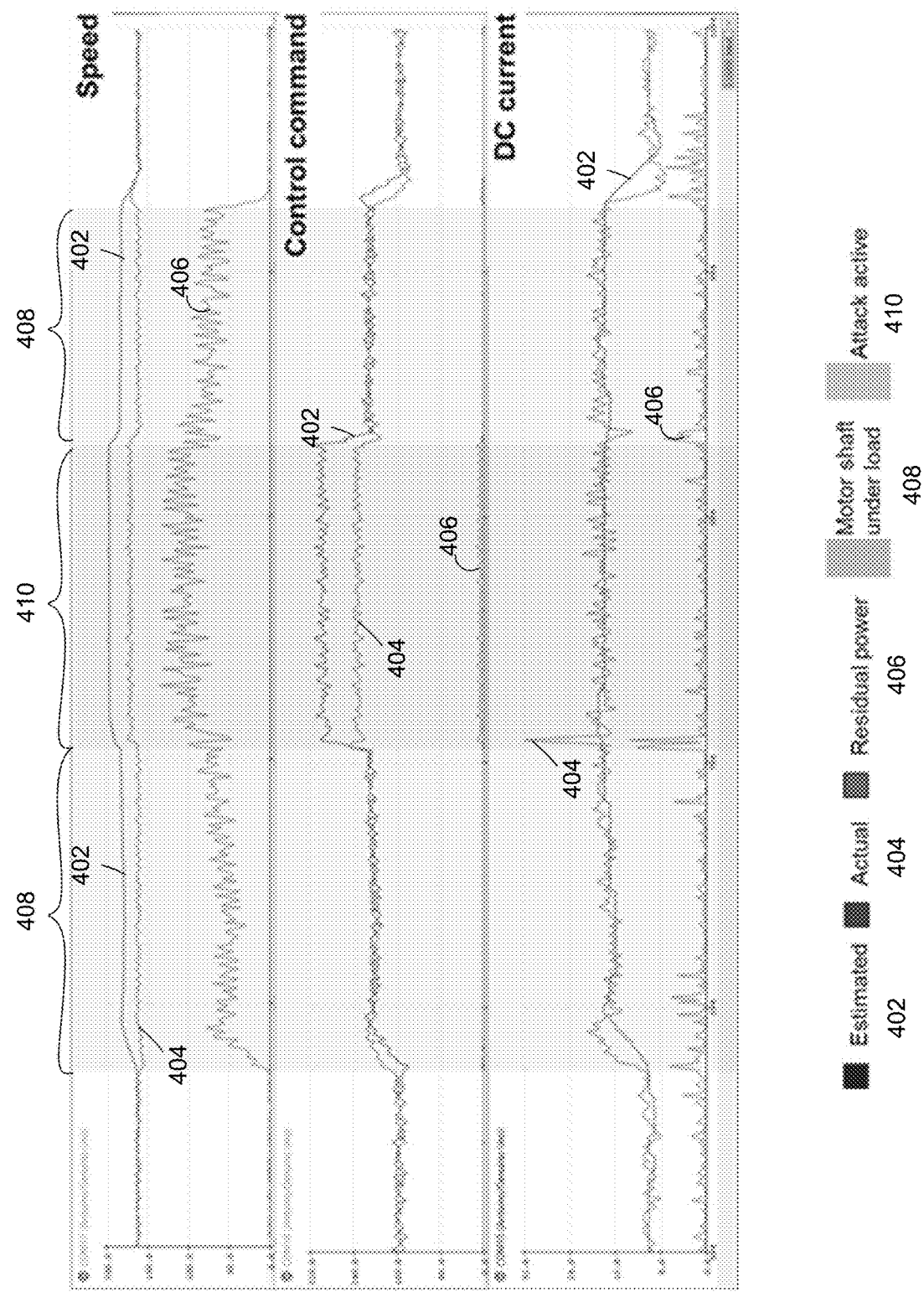

FIG. 5A illustrates an external attack against sensor data. In the case of an external sensor attack, additional features of residual signals make the attack distinct from the internal sensor attack previously presented in FIG. 4. Notice that in this case the controller output has an oscillatory nature during the attack since the control algorithm is interchangeably receiving authentic and malicious speed measurements as the input. This is also reflected on the DC current residual power, since DC current draw by the motor is the direct consequence of the control command. Oscillatory nature of residual signals clearly identifies external attacks, and the distinct pattern of other relevant signals reveals its location. Similarly, FIG. 5B illustrates an external attack against controller data, while FIG. 5C illustrates an internal attack against controller ECU.

Furthermore, several attack scenarios were exercised using the experimental setup, as illustrated in FIGS. 4 and 5A-5C. Also, FIG. 6 shows a table with information regarding attack characterization (e.g., location and/or type) based on impacted parameters, according to an embodiment. The parameters extracted from the waveforms lead to well-defined patterns which allow for the different kinds and locations of attacks to be classified. For instance, the 5th line in FIG. 6 shows that the residual signal pattern composed of increased $r_{speed}$, $r_{ctrl}$ and $r_{current}$ indicates an external attack on the actuation signal (e.g., controller command messages). Similarly, the same look-up procedure based on residuals would lead to identification of other types of attacks. Hence, some embodiments may utilize information from a table (also referred to as a table lookup) to determine the type and/or location of an attack. A table based approach in turn allows for faster responses.

In another embodiment, the increase in current (e.g., conditioned by the presence of load) is taken into account through threshold adaption for the speed residual (as outlined above with respect to residual thresholding). Similarly to individual external attacks, the approach holds in case of simultaneous external attacks on multiple signals. In the extreme case of having an advanced adversary/attacker who has full control over multiple modules, the attacker could tamper relevant signals in such a way that does not significantly increase residual powers. However, some embodiments would not let the situation to progress to that critical level as it would earlier catch any interference that the attacker may have caused in the system. Also, even though a full compromise of the system is not impossible, it would a difficult task since a combination of vulnerabilities would have to be simultaneously present in all relevant modules. Still, assuming that such a worst case happens, the control loop signal manipulation would have to be done simultaneously in such a way that they all exactly adhere to the expected behavior of the physics of the vehicle which would be practically impossible and any deviation from the expected norm would be detected by the intrusion detect system.

Figure 7:
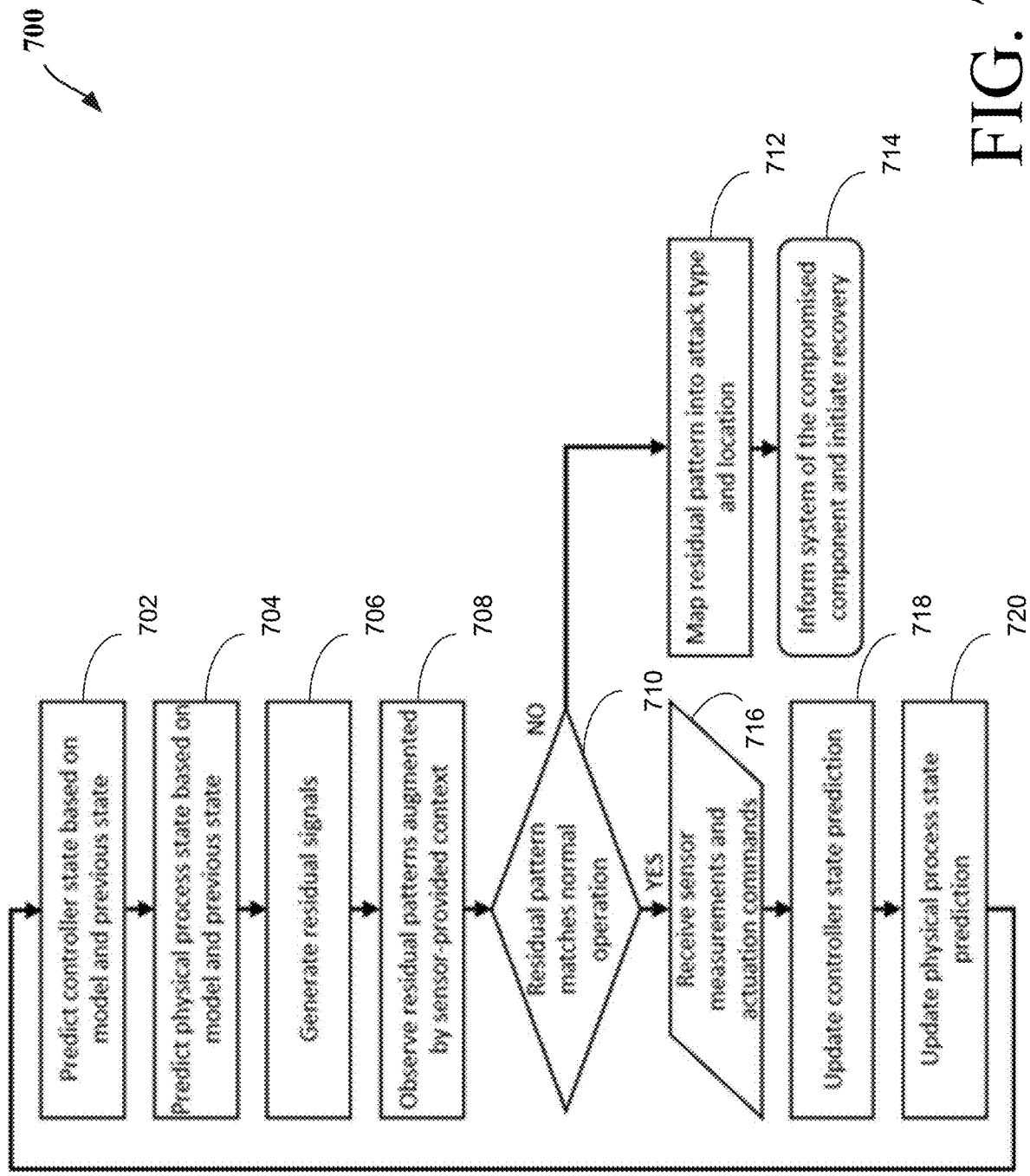
FIG. 7 illustrates a flow diagram of a method for continuous monitoring of closed-loop control systems, according to an embodiment.

FIG. 7 illustrates a flow diagram of a method 700 for continuous monitoring of closed-loop control systems, according to an embodiment. One or more components discussed herein (e.g., with reference to other figures, such as one or more logic (including logic 110, 202, 302, 304, 306, etc. and/or SoC or processors)) may be used to perform one or more operations of method 700.

Referring to FIGS. 1-7, operation 702 (e.g., logic 206) predicts controller state based on model and previous state. Operation 704 (e.g., logic 204) predicts physical process state based on model and previous state. Operation 706 generates residual signals (e.g., signals 208-A and 208-B). Operation 708 (e.g., logic 209 or portions thereof) observes residual patterns (e.g., augmented by sensor provided context). Operation 710 (e.g., logic 209 or portions thereof) determines whether residual pattern matches normal operation. If not, operation 712 (e.g., logic 209 or portions thereof) maps the residual pattern into attack type and location and operation 714 (e.g., via signal 210) informs the system of the compromised component and optionally initiates one or more recovery operations to recover from the attack. Alternatively, if there is a match at operation 710, operation 716 (e.g., logic 110, 202, 302, and/or 306) receives sensor measurements and actuation commands. Operation 718 (e.g., logic 206) updates controller state prediction information. Operation 720 (e.g., logic 204) updates physical process state prediction information before resuming at 702 of method 700.

Further, in the case of external attacks, the conflict of the authentic and the attacker's messages on the bus causes a very distinct pattern (oscillatory behavior) in the system states along with increased residual pattern (see for example region 410 of FIGS. 5A and 5B). Such an abnormal pattern can be exclusively present during this type of attack, hence false positives can be ruled out.

In the case of internal attacks, false positives can be minimized by using the sensor noise as a reference to determine the threshold. This is in turn because the control system has been already designed to tolerate variations due to sensor accuracy. Thus, any variation that is inside the noise range can be assumed to be within the normal bounds. Deviation above the expected noise levels would safely be taken as anomalous behavior.

As for state changes, the plant model allows for the prediction of a state vector which is compared to the actual system state. In valid state changes, the overall state of interest is closely related to the predicted one. The combination of the individual components, the overall system state can be used to determine how the threshold should adapt to accommodate different operational conditions (e.g., under load vs. no load). State changes caused by attacks would not conform to the plant model prediction and hence their residuals can be clearly distinguished from authentic ones, as further discussed above with reference to residual thresholding.

Also, as discussed herein, an "anomalous valid input" generally refers to a set of messages injected into the system (e.g., into the bus), either by the internal or external attacker that modifies all signals simultaneously in a way that their correlation corresponds to an overall state in conformance with the physical model of the system. First, external attackers injecting messages will quickly flag a detection due to its characteristic residual signature caused by a conflict of valid and malicious messages on the bus. In the case of internal attacks, the attacker would need to compromise all ECUs generating the anomalous input, and launch such a time-synchronized attack. As previously mentioned, this is not trivial and the attacker is more likely to be discovered in this process. But assuming the extreme case where an anomalous input injection went through and that it conforms to a valid overall system state, in order not to remain undetected, this malicious interference would have to be as small as the normal behavior of the system. Otherwise, it would represent a deviation from the expected system state, and the analytical redundant nature of the intrusion detection would still trigger an intrusion.

Figure 8:
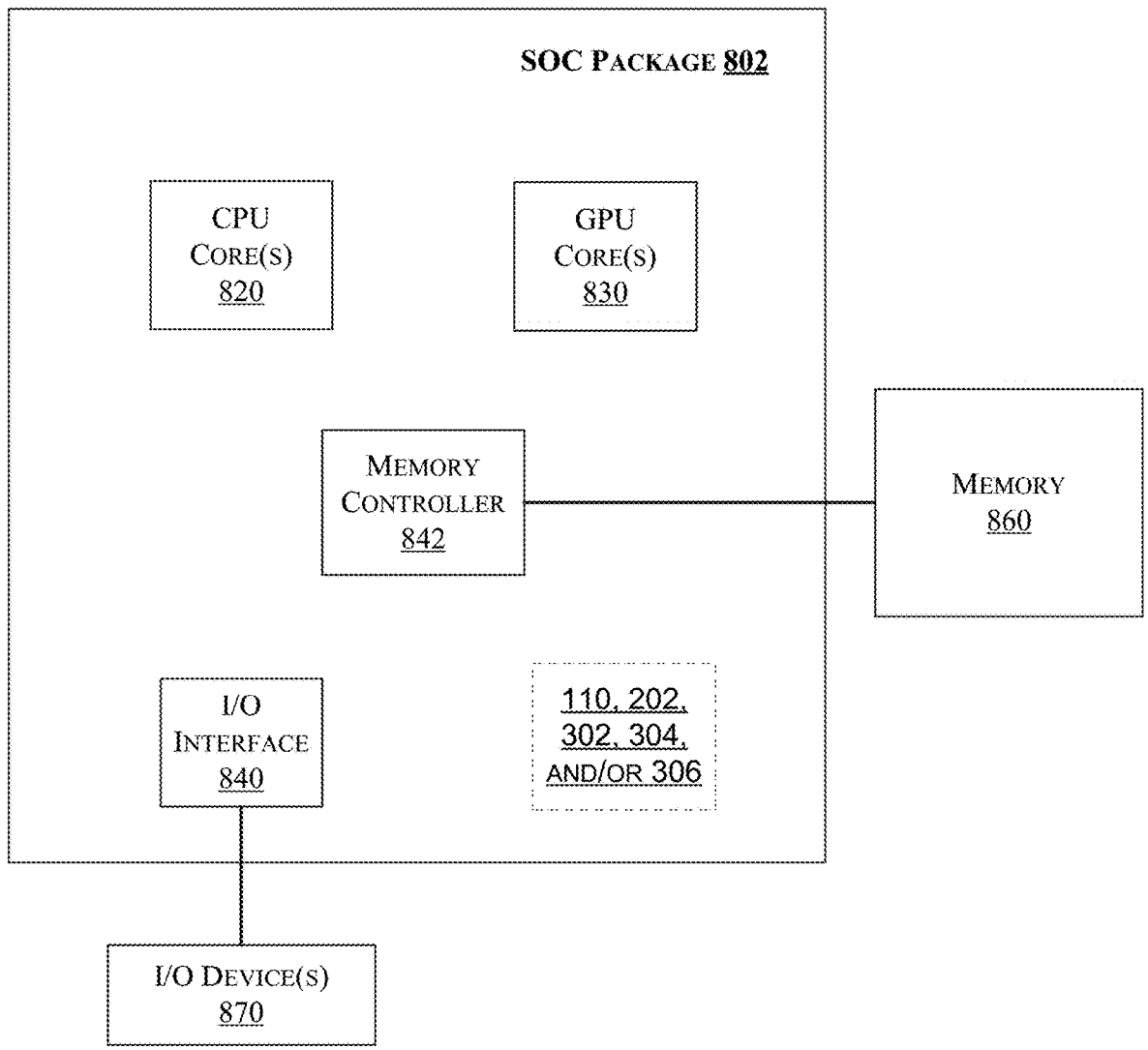
FIGS. 8 and 9 illustrates block diagrams of embodiments of computing systems, which may be utilized in various embodiments discussed herein.

FIG. 8 illustrates a block diagram of an SOC package in accordance with an embodiment. As illustrated in FIG. 8, SOC 802 includes one or more Central Processing Unit (CPU) cores 820, one or more Graphics Processor Unit (GPU) cores 830, an Input/Output (I/O) interface 840, and a memory controller 842. Various components of the SOC package 802 may be coupled to an interconnect or bus such as discussed herein with reference to the other figures. Also, the SOC package 802 may include more or less components, such as those discussed herein with reference to the other figures. Further, each component of the SOC package 820 may include one or more other components, e.g., as discussed with reference to the other figures herein. In one embodiment, SOC package 802 (and its components) is provided on one or more Integrated Circuit (IC) die, e.g., which are packaged into a single semiconductor device.

As illustrated in FIG. 8, SOC package 802 is coupled to a memory 860 via the memory controller 842. In an embodiment, the memory 860 (or a portion of it) can be integrated on the SOC package 802.

The I/O interface 840 may be coupled to one or more I/O devices 870, e.g., via an interconnect and/or bus such as discussed herein with reference to other figures. I/O device(s) 870 may include one or more of a keyboard, a mouse, a touchpad, a display, an image/video capture device (such as a camera or camcorder/video recorder), a touch screen, a speaker, or the like.

Figure 9:
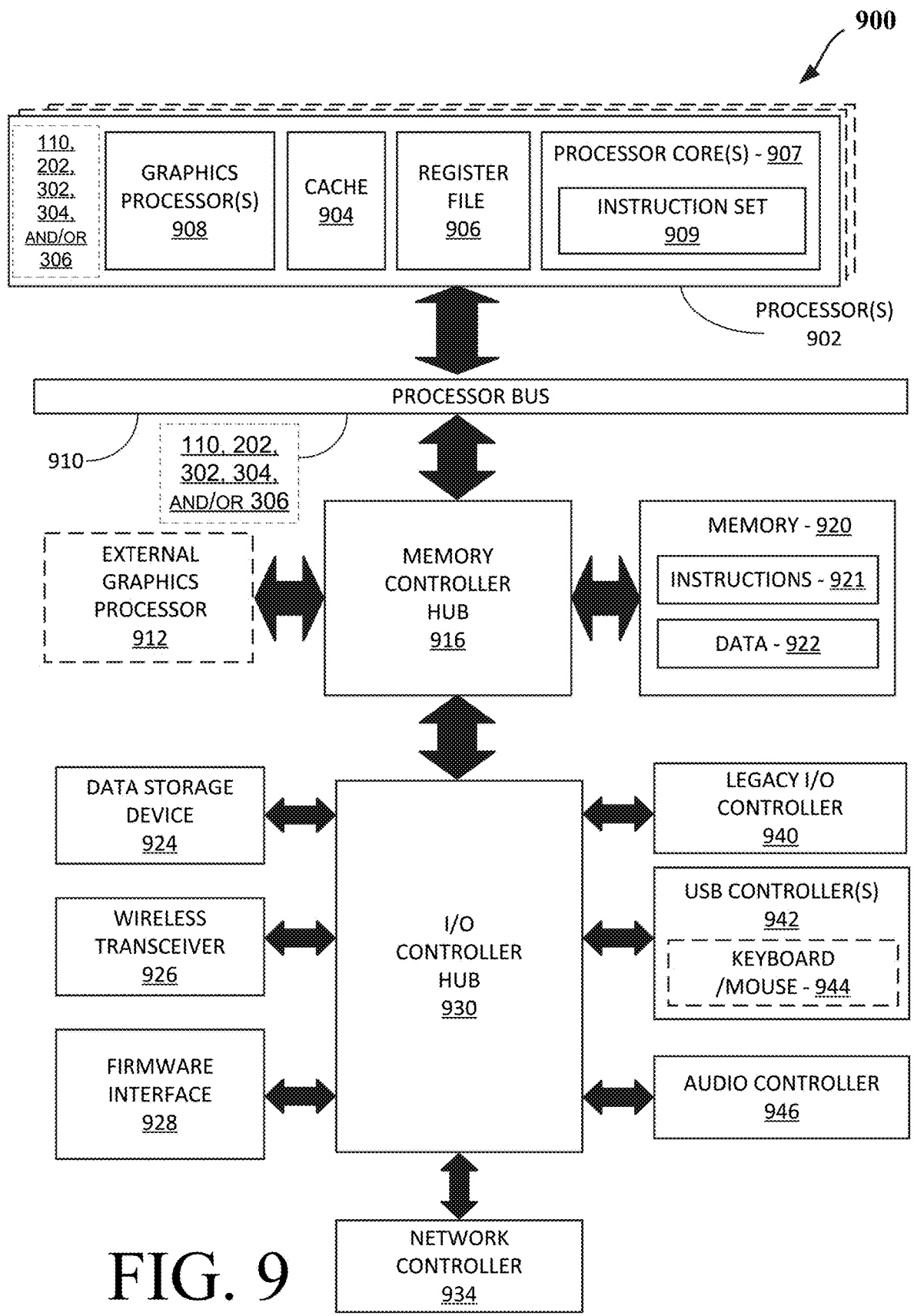

FIG. 9 is a block diagram of a processing system 900, according to an embodiment. In various embodiments the system 900 includes one or more processors 902 and one or more graphics processors 908, and may be a single processor desktop system, a multiprocessor workstation system, or a server system having a large number of processors 902 or processor cores 907. In on embodiment, the system 900 is a processing platform incorporated within a system-on-a-chip (SoC or SOC) integrated circuit for use in mobile, handheld, or embedded devices.

An embodiment of system 900 can include, or be incorporated within a server-based gaming platform, a game console, including a game and media console, a mobile gaming console, a handheld game console, or an online game console. In some embodiments system 900 is a mobile phone, smart phone, tablet computing device or mobile Internet device. Data processing system 900 can also include, couple with, or be integrated within a wearable device, such as a smart watch wearable device, smart eyewear device, augmented reality device, or virtual reality device. In some embodiments, data processing system 900 is a television or set top box device having one or more processors 902 and a graphical interface generated by one or more graphics processors 908.

In some embodiments, the one or more processors 902 each include one or more processor cores 907 to process instructions which, when executed, perform operations for system and user software. In some embodiments, each of the one or more processor cores 907 is configured to process a specific instruction set 909. In some embodiments, instruction set 909 may facilitate Complex Instruction Set Computing (CISC), Reduced Instruction Set Computing (RISC), or computing via a Very Long Instruction Word (VLIW). Multiple processor cores 907 may each process a different instruction set 909, which may include instructions to facilitate the emulation of other instruction sets. Processor core 907 may also include other processing devices, such a Digital Signal Processor (DSP).

In some embodiments, the processor 902 includes cache memory 904. Depending on the architecture, the processor 902 can have a single internal cache or multiple levels of internal cache. In some embodiments, the cache memory is shared among various components of the processor 902. In some embodiments, the processor 902 also uses an external cache (e.g., a Level-3 (L3) cache or Last Level Cache (LLC)) (not shown), which may be shared among processor cores 907 using known cache coherency techniques. A register file 906 is additionally included in processor 902 which may include different types of registers for storing different types of data (e.g., integer registers, floating point registers, status registers, and an instruction pointer register). Some registers may be general-purpose registers, while other registers may be specific to the design of the processor 902.

In some embodiments, processor 902 is coupled to a processor bus 910 to transmit communication signals such as address, data, or control signals between processor 902 and other components in system 900. In one embodiment the system 900 uses an exemplary 'hub' system architecture, including a memory controller hub 916 and an Input Output (I/O) controller hub 930. A memory controller hub 916 facilitates communication between a memory device and other components of system 900, while an I/O Controller Hub (ICH) 930 provides connections to I/O devices via a local I/O bus. In one embodiment, the logic of the memory controller hub 916 is integrated within the processor.

Memory device 920 can be a dynamic random access memory (DRAM) device, a static random access memory (SRAM) device, flash memory device, phase-change memory device, or some other memory device having suitable performance to serve as process memory. In one embodiment the memory device 920 can operate as system memory for the system 900, to store data 922 and instructions 921 for use when the one or more processors 902 executes an application or process. Memory controller hub 916 also couples with an optional external graphics processor 912, which may communicate with the one or more graphics processors 908 in processors 902 to perform graphics and media operations.

In some embodiments, ICH 930 enables peripherals to connect to memory device 920 and processor 902 via a high-speed I/O bus. The I/O peripherals include, but are not limited to, an audio controller 946, a firmware interface 928, a wireless transceiver 926 (e.g., Wi-Fi, Bluetooth), a data storage device 924 (e.g., hard disk drive, flash memory, etc.), and a legacy I/O controller 940 for coupling legacy (e.g., Personal System 2 (PS/2)) devices to the system. One or more Universal Serial Bus (USB) controllers 942 connect input devices, such as keyboard and mouse 944 combinations. A network controller 934 may also couple to ICH 930. In some embodiments, a high-performance network controller (not shown) couples to processor bus 910. It will be appreciated that the system 900 shown is exemplary and not limiting, as other types of data processing systems that are differently configured may also be used. For example, the I/O controller hub 930 may be integrated within the one or more processor 902, or the memory controller hub 916 and I/O controller hub 930 may be integrated into a discreet external graphics processor, such as the external graphics processor 912.

Figure 10:
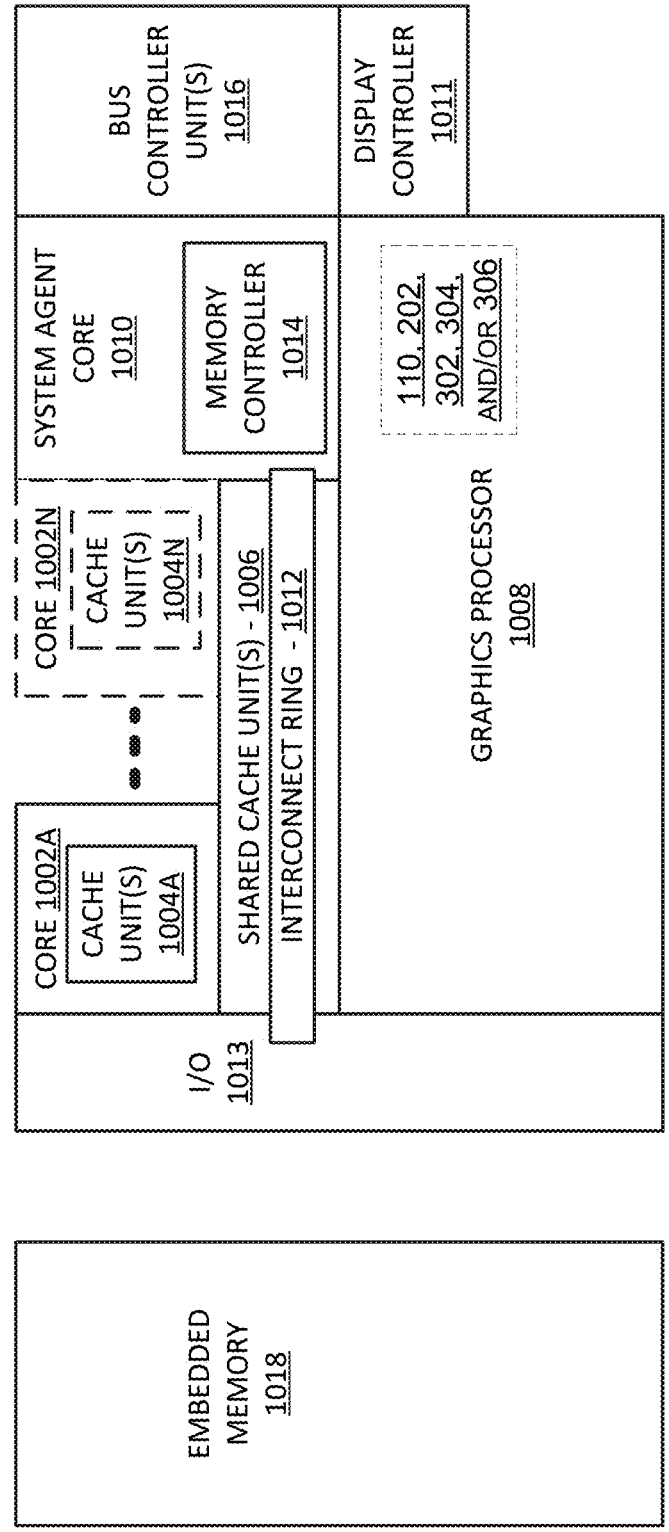
FIGS. 10 and 11 illustrate various components of processors in accordance with some embodiments.

FIG. 10 is a block diagram of an embodiment of a processor 1000 having one or more processor cores 1002A to 1002N, an integrated memory controller 1014, and an integrated graphics processor 1008. Those elements of FIG. 10 having the same reference numbers (or names) as the elements of any other figure herein can operate or function in any manner similar to that described elsewhere herein, but are not limited to such. Processor 1000 can include additional cores up to and including additional core 1002N represented by the dashed lined boxes. Each of processor cores 1002A to 1002N includes one or more internal cache units 1004A to 1004N. In some embodiments each processor core also has access to one or more shared cached units 1006.

The internal cache units 1004A to 1004N and shared cache units 1006 represent a cache memory hierarchy within the processor 1000. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 1006 and 1004A to 1004N.

In some embodiments, processor 1000 may also include a set of one or more bus controller units 1016 and a system agent core 1010. The one or more bus controller units 1016 manage a set of peripheral buses, such as one or more Peripheral Component Interconnect buses (e.g., PCI, PCI Express). System agent core 1010 provides management functionality for the various processor components. In some embodiments, system agent core 1010 includes one or more integrated memory controllers 1014 to manage access to various external memory devices (not shown).

In some embodiments, one or more of the processor cores 1002A to 1002N include support for simultaneous multi-threading. In such embodiment, the system agent core 1010 includes components for coordinating and operating cores 1002A to 1002N during multi-threaded processing. System agent core 1010 may additionally include a power control unit (PCU), which includes logic and components to regulate the power state of processor cores 1002A to 1002N and graphics processor 1008.

In some embodiments, processor 1000 additionally includes graphics processor 1008 to execute graphics processing operations. In some embodiments, the graphics processor 1008 couples with the set of shared cache units 1006, and the system agent core 1010, including the one or more integrated memory controllers 1014. In some embodiments, a display controller 1011 is coupled with the graphics processor 1008 to drive graphics processor output to one or more coupled displays. In some embodiments, display controller 1011 may be a separate module coupled with the graphics processor via at least one interconnect, or may be integrated within the graphics processor 1008 or system agent core 1010.

In some embodiments, a ring based interconnect unit 1012 is used to couple the internal components of the processor 1000. However, an alternative interconnect unit may be used, such as a point-to-point interconnect, a switched interconnect, or other techniques, including techniques well known in the art. In some embodiments, graphics processor 1008 couples with the ring interconnect 1012 via an I/O link 1013.

The exemplary I/O link 1013 represents at least one of multiple varieties of I/O interconnects, including an on package I/O interconnect which facilitates communication between various processor components and a high-performance embedded memory module 1018, such as an eDRAM (or embedded DRAM) module. In some embodiments, each of the processor cores 1002 to 1002N and graphics processor 1008 use embedded memory modules 1018 as a shared Last Level Cache.

In some embodiments, processor cores 1002A to 1002N are homogenous cores executing the same instruction set architecture. In another embodiment, processor cores 1002A to 1002N are heterogeneous in terms of instruction set architecture (ISA), where one or more of processor cores 1002A to 1002N execute a first instruction set, while at least one of the other cores executes a subset of the first instruction set or a different instruction set. In one embodiment processor cores 1002A to 1002N are heterogeneous in terms of microarchitecture, where one or more cores having a relatively higher power consumption couple with one or more power cores having a lower power consumption. Additionally, processor 1000 can be implemented on one or more chips or as an SoC integrated circuit having the illustrated components, in addition to other components.

Figure 11:
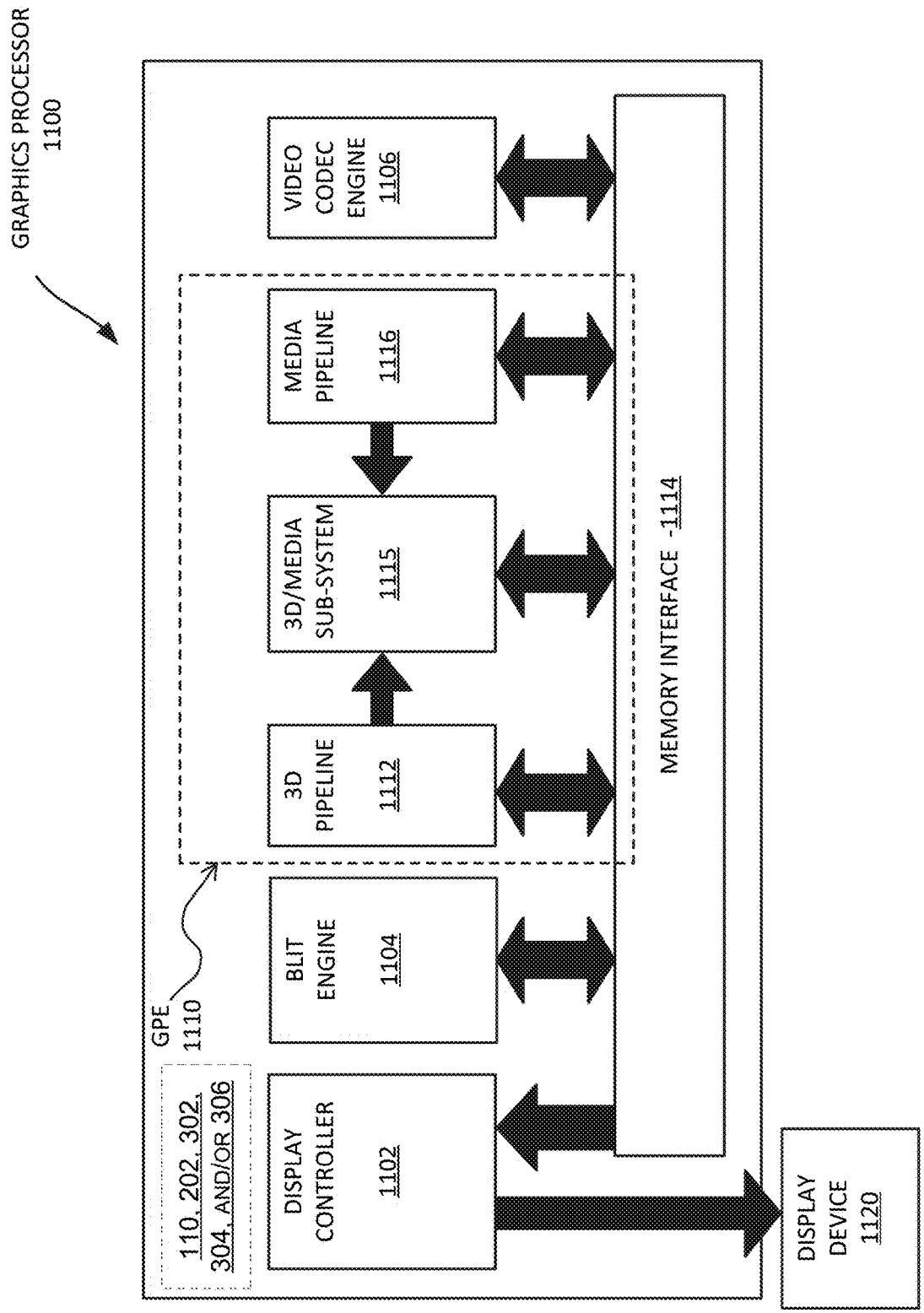

FIG. 11 is a block diagram of a graphics processor 1100, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 1100 includes a memory interface 1114 to access memory. Memory interface 1114 can be an interface to local memory, one or more internal caches, one or more shared external caches, and/or to system memory.

In some embodiments, graphics processor 1100 also includes a display controller 1102 to drive display output data to a display device 1120. Display controller 1102 includes hardware for one or more overlay planes for the display and composition of multiple layers of video or user interface elements. In some embodiments, graphics processor 1100 includes a video codec engine 1106 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 1100 includes a block image transfer (BLIT) engine 1104 to perform two-dimensional (2D) rasterizer operations including, for example, bit-boundary block transfers. However, in one embodiment, 11D graphics operations are performed using one or more components of graphics processing engine (GPE) 1110. In some embodiments, graphics processing engine 1110 is a compute engine for performing graphics operations, including three-dimensional (3D) graphics operations and media operations.

In some embodiments, GPE 1110 includes a 3D pipeline 1112 for performing 3D operations, such as rendering three-dimensional images and scenes using processing functions that act upon 3D primitive shapes (e.g., rectangle, triangle, etc.). The 3D pipeline 1112 includes programmable and fixed function elements that perform various tasks within the element and/or spawn execution threads to a 3D/Media sub-system 1115. While 3D pipeline 1112 can be used to perform media operations, an embodiment of GPE 1110 also includes a media pipeline 1116 that is specifically used to perform media operations, such as video post-processing and image enhancement.

In some embodiments, media pipeline 1116 includes fixed function or programmable logic units to perform one or more specialized media operations, such as video decode acceleration, video de-interlacing, and video encode acceleration in place of, or on behalf of video codec engine 1106. In some embodiments, media pipeline 1116 additionally includes a thread spawning unit to spawn threads for execution on 3D/Media sub-system 1115. The spawned threads perform computations for the media operations on one or more graphics execution units included in 3D/Media sub-system 1115.

In some embodiments, 3D/Media subsystem 1115 includes logic for executing threads spawned by 3D pipeline 1112 and media pipeline 1116. In one embodiment, the pipelines send thread execution requests to 3D/Media subsystem 1115, which includes thread dispatch logic for arbitrating and dispatching the various requests to available thread execution resources. The execution resources include an array of graphics execution units to process the 3D and media threads. In some embodiments, 3D/Media subsystem 1115 includes one or more internal caches for thread instructions and data. In some embodiments, the subsystem also includes shared memory, including registers and addressable memory, to share data between threads and to store output data.

The following examples pertain to further embodiments. Example 1 includes an apparatus comprising: controller state logic circuitry to receive sensor data and one or more actuation commands, wherein the controller state logic circuitry is to generate a first residual signal, corresponding to a controller state for an Autonomous Driving System (ADS) component, based on comparison of a predicted controller state model and a previous controller state; physical process state logic circuitry to receive the sensor data and the one or more actuation commands, wherein the physical process state logic circuitry is to generate a second residual signal, corresponding to a physical process state for the ADS component, based on comparison of a predicted physical process state model and a previous physical process state; and memory, coupled to the detector logic, to store information corresponding to a normal operation of the ADS component, wherein detector logic is to generate an intrusion detection signal to indicate a location and a type of a detected intrusion based on comparison of the stored information with results of pattern analysis to be applied to the first residual signal and the second residual signal. Example 2 includes the apparatus of example 1, wherein the ADS component is to comprise one or more ECUs coupled to a bus. Example 3 includes the apparatus of example 2, wherein the bus comprises a Controller Area Network (CAN) bus. Example 4 includes the apparatus of example 2, wherein the bus comprises a shared bus, a point-to-point interconnect, or combinations thereof. Example 5 includes the apparatus of example 1, wherein the detector logic is to comprise one or more of: the controller state logic circuitry and the physical process state logic circuitry. Example 6 includes the apparatus of example 1, further comprising one or more sensors to generate the sensor data. Example 7 includes the apparatus of example 6, wherein the one or more sensors comprise one or more of: a speed sensor, a direction sensor, a GPS (Global Positioning System) sensor, a gas pedal sensor, a brake pedal sensor, and an IMU (Inertial Measurement Unit) sensor. Example 8 includes the apparatus of example 1, comprising logic to initiate recover from the detected intrusion in response to the intrusion detection signal. Example 9 includes the apparatus of example 1, wherein the predicted physical process state model or the predicted controller state model are to be generated based on a Kalman filter. Example 10 includes the apparatus of example 1, wherein the predicted physical process state model and the predicted controller state model are to be updated in response to a determination that the residual pattern matches the normal operation as indicated by the stored information. Example 11 includes the apparatus of example 1, wherein an Internet of Things (IoT) device or vehicle comprises the detector logic, the controller state logic circuitry, the physical process state logic circuitry, and the memory. Example 12 includes the apparatus of example 1, wherein a processor, having one or more processor cores, comprises the detector logic, the controller state logic circuitry and the physical process state logic circuitry, or the memory. Example 13 includes the apparatus of example 1, wherein a single integrated device comprises one or more of: a processor, the detector logic, the controller state logic circuitry, the physical process state logic circuitry, and the memory.

Example 14 includes one or more computer-readable medium comprising one or more instructions that when executed on at least one processor configure the at least one processor to perform one or more operations to cause: controller state logic circuitry to receive sensor data and one or more actuation commands, wherein the controller state logic circuitry is to generate a first residual signal, corresponding to a controller state for an Autonomous Driving System (ADS) component, based on comparison of a predicted controller state model and a previous controller state; physical process state logic circuitry to receive the sensor data and the one or more actuation commands, wherein the physical process state logic circuitry is to generate a second residual signal, corresponding to a physical process state for the ADS component, based on comparison of a predicted physical process state model and a previous physical process state; and memory, coupled to the detector logic, to store information corresponding to a normal operation of the ADS component, wherein detector logic is to generate an intrusion detection signal to indicate a location and a type of a detected intrusion based on comparison of the stored information with results of pattern analysis to be applied to the first residual signal and the second residual signal. Example 15 includes the one or more computer-readable medium of example 14, further comprising one or more instructions that when executed on the at least one processor configure the at least one processor to perform one or more operations to cause initiation of recovery from the detected intrusion in response to the intrusion detection signal. Example 16 includes the one or more computer-readable medium of example 14, further comprising one or more instructions that when executed on the at least one processor configure the at least one processor to perform one or more operations to cause generation of the predicted physical process state model or the predicted controller state model based on a Kalman filter. Example 17 includes the one or more computer-readable medium of example 14, further comprising one or more instructions that when executed on the at least one processor configure the at least one processor to perform one or more operations to cause updating of the predicted physical process state model and the predicted controller state model in response to a determination that the residual pattern matches the normal operation as indicated by the stored information. Example 18 includes the one or more computer-readable medium of example 14, wherein an Internet of Things (IoT) device or vehicle comprises the detector logic, the controller state logic circuitry, the physical process state logic circuitry, and the memory.

Example 19 includes a method comprising: receiving, at controller state logic circuitry, sensor data and one or more actuation commands, wherein the controller state logic circuitry is to generate a first residual signal, corresponding to a controller state for an Autonomous Driving System (ADS) component, based on comparison of a predicted controller state model and a previous controller state; receiving, at physical process state logic circuitry, the sensor data and the one or more actuation commands, wherein the physical process state logic circuitry generates a second residual signal, corresponding to a physical process state for the ADS component, based on comparison of a predicted physical process state model and a previous physical process state; and storing information corresponding to a normal operation of the ADS component in memory, wherein detector logic generates an intrusion detection signal to indicate a location and a type of a detected intrusion based on comparison of the stored information with results of pattern analysis to be applied to the first residual signal and the second residual signal. Example 20 includes the method of example 19, further comprising initiating recovery from the detected intrusion in response to the intrusion detection signal. Example 21 includes the method of example 19, further comprising generating the predicted physical process state model or the predicted controller state model based on a Kalman filter. Example 22 includes the method of example 19, further comprising updating the predicted physical process state model and the predicted controller state model in response to a determination that the residual pattern matches the normal operation as indicated by the stored information. Example 23 includes the method of example 19, wherein an Internet of Things (IoT) device or vehicle comprises the detector logic, the controller state logic circuitry, the physical process state logic circuitry, and the memory.

Example 24 includes an apparatus comprising means to perform a method as set forth in any preceding example. Example 25 includes machine-readable storage including machine-readable instructions, when executed, to implement a method or realize an apparatus as set forth in any preceding example.

In various embodiments, the operations discussed herein, e.g., with reference to FIG. 1 et seq., may be implemented as hardware (e.g., logic circuitry or more generally circuitry or circuit), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIG. 1 et seq.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:
1. An apparatus comprising:
   controller state logic circuitry to receive sensor data and one or more actuation commands, wherein the controller state logic circuitry is to generate a first residual signal, corresponding to a controller state for an

Autonomous Driving System (ADS) component, based on comparison of a predicted controller state model and a previous controller state;

physical process state logic circuitry to receive the sensor data and the one or more actuation commands, wherein the physical process state logic circuitry is to generate a second residual signal, corresponding to a physical process state for the ADS component, based on comparison of a predicted physical process state model and a previous physical process state; and memory, coupled to detector logic, to store information corresponding to a normal operation of the ADS component, wherein the detector logic is to generate an intrusion detection signal to indicate a location and a type of a detected intrusion based on comparison of the stored information with results of pattern analysis to be applied to the first residual signal and the second residual signal, wherein the intrusion detection signal is to indicate the type of the detected intrusion as an internal attack or an external attack, wherein the ADS component comprises one or more Electronic Control Units (ECUs) coupled to a bus, wherein the internal attack is to indicate that an attacker is able to modify information at a first ECU from the one or more ECUs before the information is executed or consumed by the first ECU or communicated via the bus, wherein the internal attack is to indicate that the attacker is able to modify the sensor data or the one or more actuation commands before the one or more actuation commands are executed or consumed by the ECU.

2. The apparatus of claim 1, wherein the bus comprises a Controller Area Network (CAN) bus.

3. The apparatus of claim 1, wherein the bus comprises a shared bus, a point-to-point interconnect, or combinations thereof.

4. The apparatus of claim 1, wherein the detector logic comprises one or more of: the controller state logic circuitry and the physical process state logic circuitry.

5. The apparatus of claim 1, further comprising one or more sensors to generate the sensor data.

6. The apparatus of claim 5, wherein the one or more sensors comprise one or more of: a speed sensor, a direction sensor, a GPS (Global Positioning System) sensor, a gas pedal sensor, a brake pedal sensor, a positioning sensor, an object detection sensor, a lane detection sensor, a radar sensor, a Lidar (Light Detection and Ranging) sensor, an ultrasound sensor, and an IMU (Inertial Measurement Unit) sensor.

7. The apparatus of claim 1, comprising logic to initiate recover from the detected intrusion in response to the intrusion detection signal.

8. The apparatus of claim 1, wherein the predicted physical process state model or the predicted controller state model are to be generated based on a Kalman filter.

9. The apparatus of claim 1, wherein the predicted physical process state model and the predicted controller state model are to be updated in response to a determination that a residual pattern matches the normal operation as indicated by the stored information.

10. The apparatus of claim 1, wherein an Internet of Things (IoT) device or a vehicle comprises the detector logic, the controller state logic circuitry, the physical process state logic circuitry, and the memory.

11. The apparatus of claim 1, wherein a processor, having one or more processor cores, comprises the detector logic, the controller state logic circuitry and the physical process state logic circuitry, or the memory.

12. The apparatus of claim 1, wherein a single integrated device comprises one or more of: a processor, the detector logic, the controller state logic circuitry, the physical process state logic circuitry, and the memory.

13. The apparatus of claim 1, wherein physical process state logic circuitry is to predict a vehicle speed for a next time instant based on a vehicle speed value, a vehicle acceleration value, and the one or more physical properties of a vehicle.

14. The apparatus of claim 1, wherein the internal attack is to indicate that the attacker is able to modify the sensor data or the one or more actuation commands.

15. The apparatus of claim 1, wherein the external attack is to indicate that the attacker is able to transmit a message on the bus, coupled to the ADS component, wherein the message contains a false sensor measurement or an actuation command.

16. The apparatus of claim 1, wherein the external attack is to indicate that the attacker is able to send false information over the bus.

17. The apparatus of claim 1, wherein the predicted physical process state model is to be generated based on a physical model of the ADS component and one or more physical properties of a vehicle that comprises the ADS component.

18. One or more non-transitory computer-readable medium comprising one or more instructions that when executed on at least one processor configure the at least one processor to perform one or more operations to cause:

controller state logic circuitry to receive sensor data and one or more actuation commands, wherein the controller state logic circuitry is to generate a first residual signal, corresponding to a controller state for an Autonomous Driving System (ADS) component, based on comparison of a predicted controller state model and a previous controller state;

physical process state logic circuitry to receive the sensor data and the one or more actuation commands, wherein the physical process state logic circuitry is to generate a second residual signal, corresponding to a physical process state for the ADS component, based on comparison of a predicted physical process state model and a previous physical process state; and memory, coupled to detector logic, to store information corresponding to a normal operation of the ADS component, wherein the detector logic is to generate an intrusion detection signal to indicate a location and a type of a detected intrusion based on comparison of the stored information with results of pattern analysis to be applied to the first residual signal and the second residual signal, wherein the intrusion detection signal is to indicate the type of the detected intrusion as an internal attack or an external attack, wherein the ADS component comprises one or more Electronic Control Units (ECUs) coupled to a bus, wherein the internal attack is to indicate that an attacker is able to modify information at a first ECU from the one or more ECUs before the information is executed or consumed by the first ECU or communicated via the bus, wherein the internal attack is to indicate that the attacker is able to modify the sensor data or the one or more actuation commands before the one or more actuation commands are executed or consumed by the ECU.

19. The one or more computer-readable medium of claim 18, further comprising one or more instructions that when executed on the at least one processor configure the at least one processor to perform one or more operations to cause initiation of recovery from the detected intrusion in response to the intrusion detection signal.

20. The one or more computer-readable medium of claim 18, further comprising one or more instructions that when executed on the at least one processor configure the at least one processor to perform one or more operations to cause generation of the predicted physical process state model or the predicted controller state model based on a Kalman filter.

21. The one or more computer-readable medium of claim 18, further comprising one or more instructions that when executed on the at least one processor configure the at least one processor to perform one or more operations to cause updating of the predicted physical process state model and the predicted controller state model in response to a determination that a residual pattern matches the normal operation as indicated by the stored information.

22. The one or more computer-readable medium of claim 18, wherein an Internet of Things (IoT) device or a vehicle comprises the detector logic, the controller state logic circuitry, the physical process state logic circuitry, and the memory.

23. A method comprising:
  receiving, at controller state logic circuitry, sensor data and one or more actuation commands, wherein the controller state logic circuitry is to generate a first residual signal, corresponding to a controller state for an Autonomous Driving System (ADS) component, based on comparison of a predicted controller state model and a previous controller state;
  receiving, at physical process state logic circuitry, the sensor data and the one or more actuation commands, wherein the physical process state logic circuitry generates a second residual signal, corresponding to a physical process state for the ADS component, based on comparison of a predicted physical process state model and a previous physical process state; and
  storing information corresponding to a normal operation of the ADS component in memory,
  wherein detector logic generates an intrusion detection signal to indicate a location and a type of a detected intrusion based on comparison of the stored information with results of pattern analysis to be applied to the first residual signal and the second residual signal, wherein the intrusion detection signal is to indicate the type of the detected intrusion as an internal attack or an external attack, wherein the ADS component comprises one or more Electronic Control Units (ECUs) coupled to a bus, wherein the internal attack indicates that an attacker is able to modify information at a first ECU from the one or more ECUs before the information is executed or consumed by the first ECU or communicated via the bus, wherein the internal attack indicates that the attacker is able to modify the sensor data or the one or more actuation commands before the one or more actuation commands are executed or consumed by the ECU.

24. The method of claim 23, further comprising initiating recovery from the detected intrusion in response to the intrusion detection signal.

25. The method of claim 23, further comprising generating the predicted physical process state model or the predicted controller state model based on a Kalman filter.

26. The method of claim 23, further comprising updating the predicted physical process state model and the predicted controller state model in response to a determination that a residual pattern matches the normal operation as indicated by the stored information.

27. The method of claim 23, wherein an Internet of Things (IoT) device or a vehicle comprises the detector logic, the controller state logic circuitry, the physical process state logic circuitry, and the memory.

* * * * *